US012312969B2

(12) United States Patent
Wood et al.

(10) Patent No.: US 12,312,969 B2
(45) Date of Patent: May 27, 2025

(54) AIRFOILS FOR TURBOFAN ENGINES

(71) Applicant: General Electric Company, Schenectady, NY (US)

(72) Inventors: Trevor Howard Wood, Clifton Park, NY (US); Kishore Ramakrishnan, Rexford, NY (US); William Dwight Gerstler, Niskayuna, NY (US); Changjie Sun, Clifton Park, NY (US); Lana Maria Osusky, Rexford, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/155,118

(22) Filed: Jan. 17, 2023

(65) Prior Publication Data

US 2024/0240571 A1 Jul. 18, 2024

(51) Int. Cl.

*F01D 25/12* (2006.01)
*F01D 9/04* (2006.01)
*F01D 25/04* (2006.01)

(52) U.S. Cl.

CPC ............. *F01D 25/12* (2013.01); *F01D 9/041* (2013.01); *F01D 25/04* (2013.01); *F05D 2220/32* (2013.01); *F05D 2240/12* (2013.01); *F05D 2260/202* (2013.01); *F05D 2260/96* (2013.01)

(58) Field of Classification Search

CPC .......... F01D 25/12; F01D 9/041; F01D 25/04; F05D 2220/32; F05D 2240/12; F05D 2260/202; F05D 2260/96

See application file for complete search history.

(56) References Cited

U.S. PATENT DOCUMENTS

| | | | |
|---|---|---|---|
| 3,035,657 | A | 5/1962 | Lemon |
| 3,070,198 | A | 12/1962 | Haskell |
| 3,232,371 | A | 2/1966 | Reichert et al. |
| 3,734,234 | A | 5/1973 | Wirt |
| 3,803,754 | A | 4/1974 | Fischer |
| 3,819,009 | A | 6/1974 | Mot |

(Continued)

FOREIGN PATENT DOCUMENTS

| | | |
|---|---|---|
| EP | 0405581 B1 | 10/1993 |
| EP | 0839101 B1 | 5/1998 |

(Continued)

OTHER PUBLICATIONS

Bertolucci, An Experimental Investigation of the Grazing Flow Impedance Duct at the University of Florida for Acoustic Liner Applications, University of Florida Dissertation, 2012, 217 Pages.

(Continued)

*Primary Examiner* — Grant Moubry
*Assistant Examiner* — Ruben Picon-Feliciano
(74) *Attorney, Agent, or Firm* — Dority & Manning, P.A.

(57) ABSTRACT

Airfoil include a body extending along a spanwise direction between a root end and a tip end, the body comprising a plurality of acoustic cavities each having an inlet on the airfoil; and at least one cooling channel having an inlet section an outlet section and a middle section within the airfoil extending between the inlet section and the outlet section; and at least one porous face sheet positioned on at least one inlet of the plurality of acoustic cavities.

19 Claims, 18 Drawing Sheets

(56) References Cited

U.S. PATENT DOCUMENTS

| | | | |
|---|---|---|---|
| 3,831,710 | A | 8/1974 | Wirt |
| 3,850,261 | A | 11/1974 | Hehmann et al. |
| 3,905,443 | A | 9/1975 | Sieuzac |
| 3,913,702 | A | 10/1975 | Wirt et al. |
| 4,001,473 | A | 1/1977 | Cook |
| 4,035,535 | A | 7/1977 | Taylor |
| 4,074,496 | A | 2/1978 | Fischer |
| 4,141,433 | A | 2/1979 | Warnaka |
| 4,243,117 | A | 1/1981 | Warnaka |
| 4,265,955 | A | 5/1981 | Harp et al. |
| 4,291,080 | A | 9/1981 | Ely et al. |
| 4,298,090 | A | 11/1981 | Chapman |
| 4,339,018 | A | 7/1982 | Warnaka |
| 4,551,110 | A | 11/1985 | Selvage et al. |
| 4,676,762 | A | 6/1987 | Ballard |
| 5,353,502 | A | 10/1994 | Hattori et al. |
| 5,445,861 | A | 8/1995 | Newton et al. |
| 5,480,729 | A | 1/1996 | Hattori et al. |
| 5,690,035 | A | 11/1997 | Hatayama et al. |
| 5,959,264 | A | 9/1999 | Brück et al. |
| 6,182,787 | B1 | 2/2001 | Kraft et al. |
| 6,200,664 | B1 | 3/2001 | Figge et al. |
| 6,203,656 | B1 | 3/2001 | Syed |
| 6,206,136 | B1 | 3/2001 | Swindlehurst et al. |
| 6,209,679 | B1 | 4/2001 | Hogeboom et al. |
| 6,256,959 | B1 | 7/2001 | Palmersten |
| 6,630,093 | B1 | 10/2003 | Jones |
| 6,772,857 | B2 | 8/2004 | Porte et al. |
| 6,840,349 | B2 | 1/2005 | Andre et al. |
| 6,871,725 | B2 | 3/2005 | Johnson |
| 6,884,486 | B2 | 4/2005 | Estrin et al. |
| 6,913,570 | B2 | 7/2005 | Kehrle |
| 7,410,455 | B2 | 8/2008 | Akishev et al. |
| 7,484,592 | B2 | 2/2009 | Porte et al. |
| 7,510,052 | B2 | 3/2009 | Ayle |
| 7,866,377 | B2 | 1/2011 | Slaughter |
| 7,900,438 | B2 | 3/2011 | Venkataramani et al. |
| 7,906,205 | B2 | 3/2011 | Meres |
| 7,921,966 | B2 | 4/2011 | Chiou et al. |
| 7,935,205 | B2 | 5/2011 | Bogue et al. |
| 7,954,224 | B2 | 6/2011 | Douglas |
| 7,963,362 | B2 | 6/2011 | Lidoine |
| 7,967,108 | B2 | 6/2011 | Harper |
| 7,971,684 | B2 | 7/2011 | Gantie et al. |
| 8,016,230 | B2 | 9/2011 | Fogarty et al. |
| 8,047,326 | B2 | 11/2011 | Valleroy et al. |
| 8,333,552 | B2 | 12/2012 | Wood et al. |
| 8,464,831 | B2 | 6/2013 | Olander Burak et al. |
| 8,579,076 | B2 | 11/2013 | Ayle et al. |
| 8,616,834 | B2 | 12/2013 | Knight, III et al. |
| 8,689,936 | B2 | 4/2014 | Richter |
| 8,691,333 | B2 | 4/2014 | Godfrey et al. |
| 8,784,592 | B2 | 7/2014 | Kolax et al. |
| 8,789,652 | B2 | 7/2014 | Swallowe et al. |
| 8,905,189 | B2 | 12/2014 | Ayle et al. |
| 8,985,513 | B2 | 3/2015 | Dean et al. |
| 8,997,923 | B2 | 4/2015 | Ichihashi |
| 9,175,474 | B2 | 11/2015 | May et al. |
| 9,222,229 | B1 | 12/2015 | Chang et al. |
| 9,249,666 | B2 | 2/2016 | Wood et al. |
| 9,284,726 | B2 | 3/2016 | Tien |
| 9,290,274 | B2 | 3/2016 | Roach et al. |
| 9,296,044 | B2 | 3/2016 | Douglas |
| 9,302,869 | B2 | 4/2016 | Kendrick et al. |
| 9,365,022 | B2 | 6/2016 | Kendrick et al. |
| 9,378,721 | B2 | 6/2016 | Zalewski et al. |
| 9,514,734 | B1 | 12/2016 | Jones et al. |
| 9,546,602 | B2 | 1/2017 | Julliard et al. |
| 9,607,600 | B2 | 3/2017 | Swallowe et al. |
| 9,693,166 | B2 | 6/2017 | Herrera et al. |
| 9,759,447 | B1 | 9/2017 | Mathur |
| 9,909,448 | B2 | 3/2018 | Gerstler et al. |
| 9,909,471 | B2 | 3/2018 | Mattia |
| 9,978,354 | B2 | 5/2018 | Nampy |
| 10,032,445 | B1 | 7/2018 | Linch et al. |
| 10,107,139 | B1 | 10/2018 | Jones et al. |
| 10,174,675 | B2 | 1/2019 | Martinez et al. |
| 10,209,009 | B2 | 2/2019 | Gerstler et al. |
| 10,301,942 | B2 | 5/2019 | Joseph et al. |
| 10,655,538 | B2 | 5/2020 | Gilson et al. |
| 10,731,473 | B2 | 8/2020 | Snyder et al. |
| 10,739,077 | B2 | 8/2020 | Gerstler et al. |
| 10,830,056 | B2 | 11/2020 | Erno et al. |
| 10,982,553 | B2 | 4/2021 | Rathay et al. |
| 10,995,996 | B2 | 5/2021 | Erno et al. |
| 2004/0048027 | A1 | 3/2004 | Hayes et al. |
| 2010/0307867 | A1 | 12/2010 | Ogawa et al. |
| 2011/0100749 | A1 | 5/2011 | Nonogi et al. |
| 2011/0244213 | A1 | 10/2011 | Jones |
| 2013/0156592 | A1* | 6/2013 | Kray ........................ F01D 5/282 416/229 A |
| 2013/0306402 | A1 | 11/2013 | Todorovic |
| 2014/0133964 | A1 | 5/2014 | Ayle |
| 2014/0251481 | A1 | 9/2014 | Kroll et al. |
| 2014/0305529 | A1 | 10/2014 | Kroll et al. |
| 2014/0341744 | A1 | 11/2014 | Cazuc et al. |
| 2015/0027629 | A1 | 1/2015 | Butler et al. |
| 2015/0044413 | A1 | 2/2015 | Vauchel et al. |
| 2015/0064015 | A1 | 3/2015 | Perez |
| 2015/0110603 | A1 | 4/2015 | Biset et al. |
| 2015/0292413 | A1 | 10/2015 | Soria et al. |
| 2015/0373470 | A1 | 12/2015 | Herrera et al. |
| 2016/0010863 | A1 | 1/2016 | Ott et al. |
| 2016/0017775 | A1 | 1/2016 | Mattia |
| 2016/0017810 | A1 | 1/2016 | Lord et al. |
| 2016/0052057 | A1 | 2/2016 | Xu |
| 2016/0067938 | A1 | 3/2016 | Goodrich |
| 2016/0109130 | A1 | 4/2016 | Stastny et al. |
| 2016/0123160 | A1 | 5/2016 | Strock et al. |
| 2016/0319690 | A1 | 11/2016 | Lin et al. |
| 2017/0043550 | A1 | 2/2017 | Coïc et al. |
| 2017/0045059 | A1 | 2/2017 | Care et al. |
| 2017/0072638 | A1 | 3/2017 | Hayes et al. |
| 2017/0191414 | A1 | 7/2017 | Martinez et al. |
| 2018/0016987 | A1 | 1/2018 | Howarth et al. |
| 2018/0162542 | A1 | 6/2018 | VanDeMark et al. |
| 2018/0174568 | A1 | 6/2018 | Porte et al. |
| 2018/0218723 | A1 | 8/2018 | Lin et al. |
| 2018/0245516 | A1 | 8/2018 | Howarth et al. |
| 2019/0080679 | A1 | 3/2019 | Alstad |
| 2019/0270504 | A1 | 9/2019 | Cedar et al. |
| 2020/0049068 | A1 | 2/2020 | Lin et al. |
| 2020/0109664 | A1 | 4/2020 | Herman et al. |
| 2020/0200017 | A1 | 6/2020 | Taylor et al. |
| 2020/0309028 | A1 | 10/2020 | Murugappan et al. |
| 2021/0003074 | A1* | 1/2021 | Gea Aguilera ......... B64D 33/02 |
| 2022/0162952 | A1* | 5/2022 | Zaccardi ................. F01D 9/065 |
| 2023/0203987 | A1* | 6/2023 | Arroyo ..................... F02C 6/08 60/785 |

FOREIGN PATENT DOCUMENTS

| | | | |
|---|---|---|---|
| EP | 2960023 | A1 | 12/2015 |
| EP | 3232434 | A1 | 10/2017 |
| GB | 2361035 | A | 10/2001 |
| JP | S58156052 | U | 10/1983 |
| JP | H0333897 | A | 2/1991 |
| WO | WO2016/0133501 | A1 | 8/2016 |

OTHER PUBLICATIONS

Bielak et al., Advanced Nacelle Acoustic Lining Concepts Development, NASA, CR-2002-211672, Aug. 2002, Total pp. 203.

Dai et al., Acoustic of a Perforated Liner with Grazing Flow: Floquet-Bloch Periodical Approach Versus Impedance Continuous Approach, Research Gate, The Journal of the Acoustical Society of America, Sep. 2016, 10 Pages. http://dx.doi.org/10.1121/1.4962490.

Dannemann et al., Experimental Study of Advanced Helmholtz Resonator Liners with Increased Acoustic Performance by Utilising Material Damping Effects, Applied Sciences, 2018, 18 Pages.

Guo et al., Far Term Noise Reduction Roadmap for the Mid-Fuselage Nacelle Subsonic Transport, AIAA-2016-2787, NASA

(56) References Cited

OTHER PUBLICATIONS

American Institute of Aeronautics and Astronautics, 2019, 25 Pages. https://ntrs.nasa.gov/api/citations/20190027212/downloads/20190027212.pdf.
Jones, et al., Evaluation of Parallel-Element, Variable-Impedance, Broadband Acoustic Liner Concepts, AIAA-2012-2194, Jun. 2012, 17 Pages.
Jones, et al., Evaluation of Novel Liner Concepts for Fan and Airframe Noise Reduction, AIAA-2009-3142, NASA American Institute of Aeronautics and Astronautics, 2016, 18 Pages. https://ntrs.nasa.gov/api/citations/20160009098/downloads/20160009098.pdf.
Kors et al., Optimisation for Low Environmental Noise Impact AIRcraft—Openair, Safran, Senecma France, 2014, 8 Pages. http://www.acoustics.asn.au/conference_proceedings/INTERNOISE2014/papers/p279.pdf.
Kraft et al., Acoustic Treatment Design Scaling Methods, vol. 2: Advanced Treatment Impedance Models for High Frequency Ranges, NASA, CR-1999-209120, vol. 2, 1999, Total pp. 98.
Lawn, Acoustic Pressure Losses in Woven Screen Regenerators, ResearchGate, Applied Acoustics, vol. 77, Mar. 2014, pp. 42-48.
Malmary et al., Acoustic Impedance Measurement with Grazing Flow, AIAA-2001-2193, 7$^{th}$ AIAA/CEAS Aeroacoustics Conference, May 2001, Netherlands, 9 Pages.
Martinson, Mechanical Design for 3D Printing, Nov. 2012, 15 pages. http://eikimartinson.com/engineering/3dparts/#dovetail.
Motsinger et al., Design and Performance of Duct Acoustic Treatment, NASA, N92-14783, 1991, pp. 165-206. https://ntrs.nasa_gov/archive/nasa/casi.ntrs.nasa.gov/19920005565.pdf.
Nark et al., Acoustic Liner Overview, Acoustics Technical Working Group Meeting, Nasa Langley Research Center, Cleveland, Oct. 22-23, 2019, pp. 1-25.
Primus et al., ONERA-NASA Cooperative Effort on Liner Impedance Education, AIAA 2013-2273, Research Gate, 19$^{th}$ AIAA/CEAS Aeroacoustics Conference, May 2013, Germany, 16 Pages.
Schiller et al., Experimental Evaluation of Acoustic Engine Liner Models Developed with COMSOL Multiphysics, 23$^{rd}$ American Institute of Aeronautics and Astronautics, DEAS Aeroacoustics Conference, NASA, 2017, 25 Pages. https://ntrs.nasa.gov/archive/nasa/casi.ntrs.nasa.gov/20170005768.pdf.
Sellen et al., Noise Reduction in a Flow Duct: Implementation of a Hybrid Passive/Active Solution, Science Direct, Journal of Sound and Vibration, vol. 297, 2006, pp. 492-511.
Soderman et al., Design and Development of a Deep Acoustic Lining for the 40-by 80 Foot Wind Tunnel Test Station, NASA TP-2002-211850, Nov. 2002, 61 Pages.
Syed et al., Paper No. 07ATC-43 Development of the Acousti-Cap TM Technology Double-Layer Acoustic Liners in Aircraft Engine Nacelles, Research Gate, 2007 SAE International, 23 Pages.
Tam et al., Experimental Validation of Numerical Simulations for an Acoustic Liner in Grazing Flow, 30 Pages. https://ntrs.nasa.gov/archive/nasa/casi.ntrs.nasa.gov/20130014086.pdf.
Tam et al., Numerical Simulation of a Slit Resonator in a Grazing Flow, AIAA 2006-799, 44$^{th}$ AIAA Aerospace Meeting and Exhibit, Nevada, 2006, 20 Pages.
Zhang, Numerical Simulation of Two-Dimensional Acoustic Liners with High Speed Grazing Flow, MS Thesis, Urbana, Illinois, 2010, 90 Pages.
Zhou, Acoustic Characterization of Orifices and Perforated Liners with Flow and High-Level Acoustic Excitation, DiVA Digitala Vetenskapliga Arkivet, KTH Royal Institute of Technology School of Engineering Sciences (SCI), Aeronautical and Vehicle Engineering, MWL Flow Acoustics, Doctoral Thesis, Stockholm, p. vi, 2015 , 70 Pages. http://www.diva-portal.org/smash/record.jsf?pid=diva2:813073.

* cited by examiner

AIRFOILS FOR TURBOFAN ENGINES

FIELD

The present subject matter relates generally to an airfoil, such as an airfoil for a turbofan engine.

BACKGROUND

A turbofan engine, which is a type of propulsion system, generally includes a fan and a turbomachine arranged in flow communication with one another. Additionally, the turbomachine of the turbofan engine can include, in serial flow order, a compressor section, a combustion section, and a turbine section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The fan includes a plurality of circumferentially spaced fan blades extending radially outward from a rotor disk. Rotation of the fan blades creates an airflow through the inlet to the turbomachine, as well as an airflow over the turbomachine. For certain turbofan engines, a plurality of outlet guide vanes are provided downstream of the fan for straightening the airflow from the fan to increase, e.g., an amount of thrust generated by the fan.

Other propulsion systems, such as a hybrid-electric turbofan engine or an electric propulsion system, can include an electrically driven fan. These propulsion systems can include airfoils, such as a plurality of outlet guide vanes that are provided downstream of the electrically driven fan.

Improvements to the outlet guide vanes, and other airfoils within the propulsion system, would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
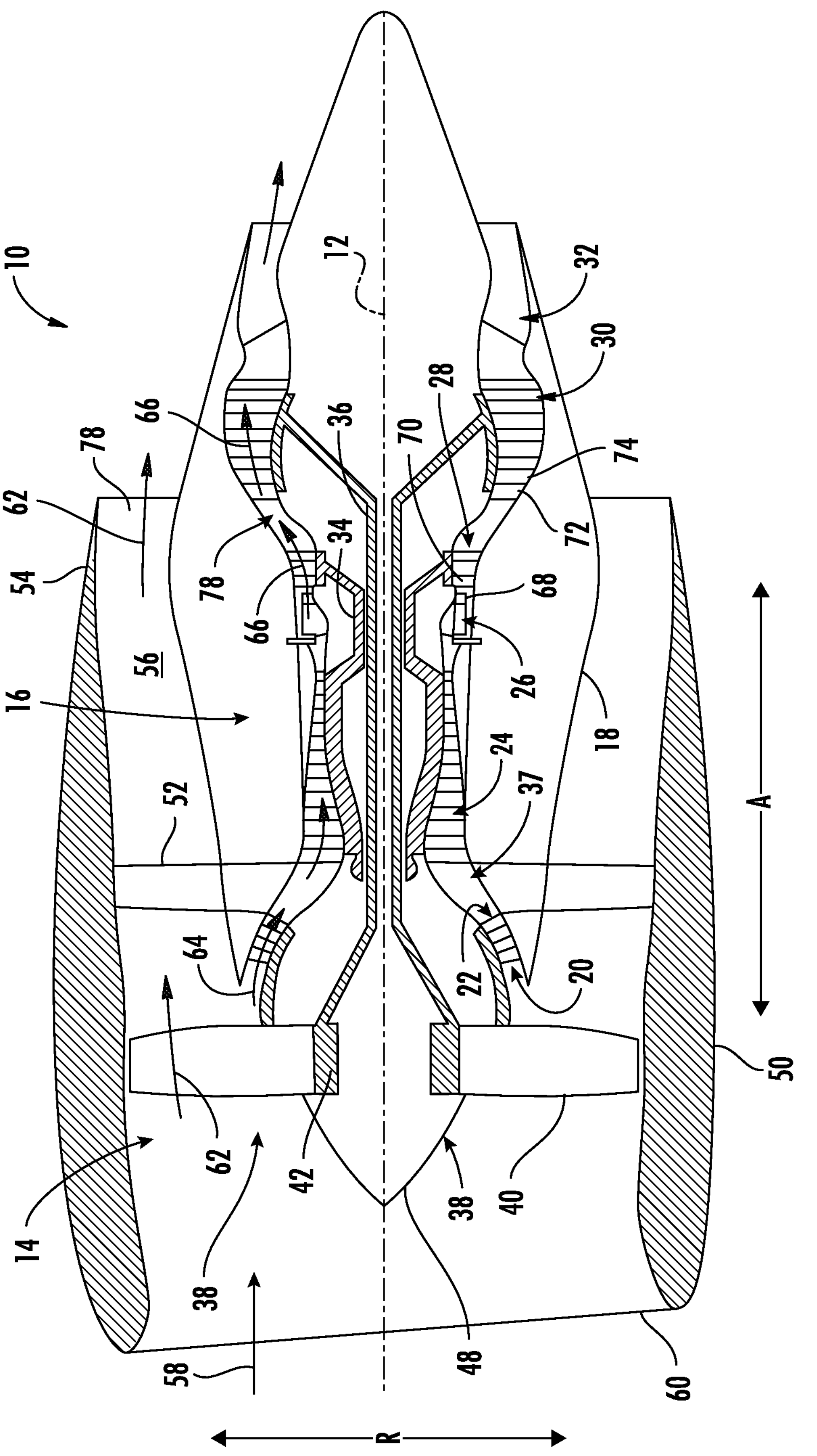
FIG. 1 is a schematic cross-sectional view of a turbofan engine in accordance with an exemplary embodiment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the embodiment.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

As used herein, the terms “first”, “second”, and “third” may be used interchangeably to distinguish one component from another and are not intended to signify location or importance of the individual components.

The terms “forward”, “foremost”, and “aft” refer to relative positions within a turbofan engine or vehicle, and refer to the normal operational attitude of the turbofan engine or vehicle. For example, with regard to a turbofan engine, forward refers to a position closer to an engine inlet and aft refers to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

The terms “coupled,” “fixed,” “attached to,” and the like refer to both direct coupling, fixing, or attaching, as well as indirect coupling, fixing, or attaching through one or more intermediate components or features, unless otherwise specified herein.

The singular forms “a”, “an”, and “the” include plural references unless the context clearly dictates otherwise.

The terms “additive manufacturer,” “additive manufacturing,” and the like refer to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, an electron beam melting (EBM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed the subject matter.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain aspects of the present disclosure, an airfoil for a turbofan engine is provided. The airfoil generally includes an acoustic suppression assembly, a heat exchanger assembly, or a combination thereof. The acoustic suppression assembly includes a plurality of acoustic cavities disposed within a body of the airfoil, wherein each of the plurality of acoustic cavities has an inlet located at a leading edge of the airfoil. The acoustic suppression assembly also generally includes a porous face sheet positioned on at least one inlet of the plurality of acoustic cavities. An airfoil with the porous face sheet positioned on at least one inlet of the plurality of acoustic cavities may provide for reduced noise. When the airfoil is an outlet guide vane of the turbofan engine for example, the airfoil may provide for reduced wake-vane interaction noise of the turbofan engine.

Placing acoustic cavities with inlets located at the leading edge of the airfoil may reduce the amount of noise generated while reducing the amount of surface area that includes the inlets and/or the porous face sheet. Reducing the amount of surface area that includes the inlets and/or the porous face sheet can improve the aerodynamic performance of the airfoil. Alternatively, by placing acoustic cavities with inlets located at the leading edge as well as placing acoustic cavities with inlets located at locations downstream from the leading edge could allow for significantly greater combined noise attenuation than if the leading edges were left untreated.

The heat exchanger assembly generally includes cooling channels having an inlet section, an outlet section, and a middle section extending therebetween. The inlet section and outlet section can be positioned at various locations within the airfoil such as, for example, both located at the root end of the airfoil, one located at the root end of the airfoil and one located at the tip end of the airfoil, or other variations with one or more different locations about the airfoil. The cooling channel is configured to receive a fluid from the turbofan engine, such as engine oil. The fluid can thereby enter the cooling channel an elevated temperature. As the fluid passes through the cooling channel, it is cooled due to thermal dynamic interaction with the airfoil and the airflow passing over the airfoil. The fluid is then returned to the turbofan engine at a lower temperature for continued utilization during operation.

In certain exemplary aspects, the leading edge may define a plurality of peaks and a plurality of valleys alternatingly arranged along the spanwise direction of the airfoil. The inlets of the plurality of acoustic cavities can be positioned in the plurality of valleys and a porous face sheet can be positioned on each of the inlets of the plurality of acoustic cavities. The plurality of peaks, in some examples, do not include inlets of the plurality of acoustic cavities and/or the porous face sheets, as such, the plurality of peaks include impermeable surfaces. Including the inlets of the acoustic cavities in the valleys and including impermeable surfaces in the peaks may provide for reduced noise generated by the airfoil. That is, having inlets in the valleys provides acoustic cavities for treating noise at the louder source. The interior of the airfoil further provides space for longer cavity lengths to treat the predominant noise source. Thus, providing inlets in the valleys with impermeable surfaces at the peaks can balance the properties (e.g., aeroacoustics) of the leading edge while still effectively treating the primary sources of noise.

In certain exemplary aspects, the airfoil may only include the inlets of the acoustic cavities and the porous face sheets on a suction side or a pressure side of an airfoil, but not both. Including the inlets of the acoustic cavities on only one of the suction side or the pressure side of the airfoil and including impermeable surfaces in the other of the suction side or the pressure side of the airfoil can also provide a balance of noise reduction and airfoil noise source distribution.

In certain exemplary aspects, the heat exchanger may have a cooling channel that includes internal beams that at least partially extend across interior passages between the walls of the cooling channel. The internal beams can increase cooling of the fluid passing through the cooling channel by increasing the overall surface area the fluid interacts with and/or by adding turbulence in the fluid to increase the heat transfer coefficient of the fluid in the cooling channel. In certain exemplary aspects, the cooling channel may contain multiple secondary branches such as through bifurcation or trifurcation. The multiple secondary branches can also increase cooling of the fluid passing through the cooling channel by increasing the total residence time of the fluid in the cooling channel. In certain exemplary aspects, the cooling channel can be interwoven with the plurality of acoustic cavities. The interwoven configuration can increase the integration of both the acoustic suppression features and the heat exchanger capabilities.

Accordingly, alternative airfoils and turbofan engines would be welcomed in the art, including those having outlet guide vanes incorporating noise attenuation and heat exchanger capabilities.

Referring now to the drawings, wherein identical numerals indicate the same elements throughout the Figures, FIG. 1 is a schematic cross-sectional view of a turbofan engine in accordance with an exemplary embodiment. More particularly, for the embodiment of FIG. 1, the turbofan engine is a high bypass ratio turbofan engine, referred to herein as "turbofan engine 10." As shown in FIG. 1, the turbofan engine 10 defines an axial direction A (extending parallel to a longitudinal centerline 12 provided for reference), a radial direction R, and a circumferential direction C (see FIG. 2). In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow arrangement, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22 including the fan. The compressor section, combustion section 26, turbine section, and jet exhaust nozzle section 32 together define a core air flowpath 37.

For the embodiment depicted, the fan section 14 includes a fan 38 having a plurality of fan blades 40 coupled to a rotor disk 42 in a spaced apart manner. As depicted, the fan blades 40 extend outwardly from rotor disk 42 generally along the radial direction R. The rotor disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. It should be appreciated that the nacelle 50 may be configured to be partly supported relative to the core by a plurality of circumferentially-spaced outlet guide vanes 52. a downstream section 54 of the nacelle 50 may extend over an outer portion of the turbomachine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured as a variable pitch fan including, e.g., a suitable actuation assembly for rotating the plurality of fan blades about respective pitch axes, the turbofan engine 10 may be configured as a geared turbofan engine having a reduction gearbox between the LP shaft or spool 36 and fan section 14, etc. It should also be appreciated, that in still other exemplary embodiments, aspects of the present disclosure may be incorporated into any other suitable turbofan engine. For example, in other exemplary embodiments, aspects of the present disclosure may be incorporated into other propulsion systems, such as a turboprop engine, or an unducted or open fan engine. The unducted or open fan engine may be a contra-rotating open rotor fan engine or a single-rotation open fan engine. In another example, aspects of the present disclosure may be incorporated into other airfoils, such as a wing of an aircraft, a strut, or a pylon, which can connect a propulsion system to the airframe of an aircraft.

Figure 2:
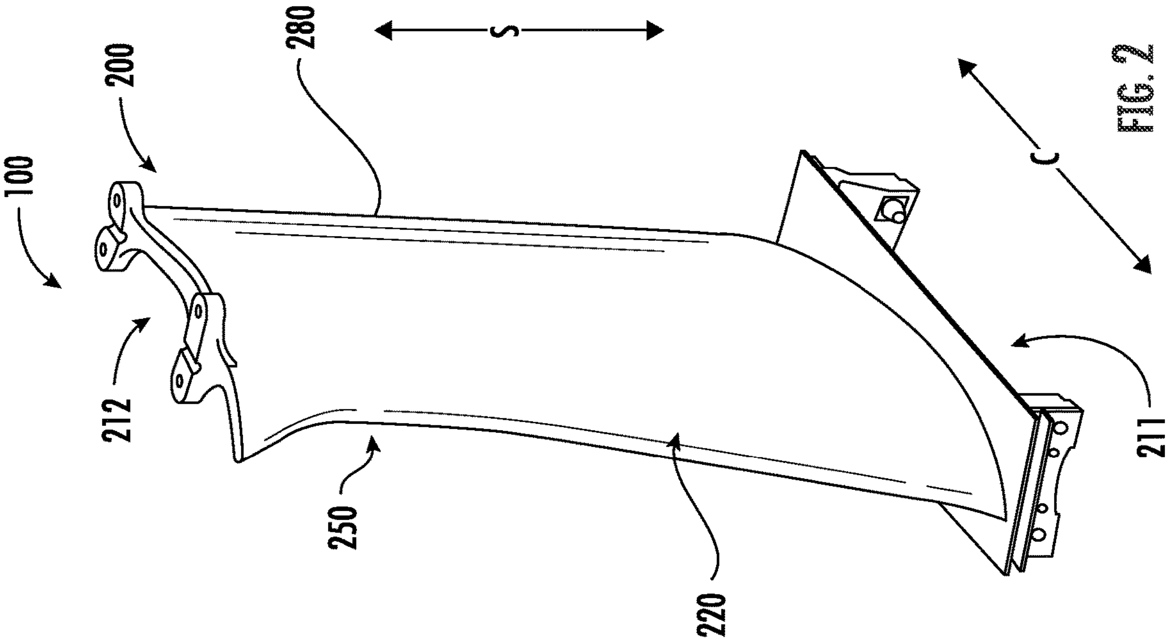
FIG. 2 is a perspective view of an airfoil in accordance with one or more exemplary embodiments.

Referring now to FIG. 2, a perspective view of an airfoil 200 in accordance with an exemplary embodiment is provided. More specifically, FIG. 2 provides a perspective view of an outlet guide vane 100 of the plurality of circumferentially-spaced outlet guide vanes 52 (FIG. 1), according to an example embodiment. Even though the airfoil 200 will be described frequently as an airfoil for a turbofan engine, such as turbofan engine 10, the airfoil 200 can also be an airfoil for other propulsion systems, such as an airfoil for a hybrid electric propulsion system or an airfoil for an electric propulsion system. Even more specifically, the airfoil 200 can be an outlet guide vane for a turbofan engine, a hybrid electric propulsion system, or an electric propulsion system.

The airfoil 200, such as the outlet guide vane 100, defines a spanwise direction S, which may generally align with a radial direction of a turbofan engine incorporating the airfoil 200, and a chordwise direction C, as well as a leading edge 250, and a trailing edge 280. The airfoil 200 generally includes a body 220 extending along the spanwise direction S between a root end 211 and a tip end 212 of the airfoil 200.

Figure 3:
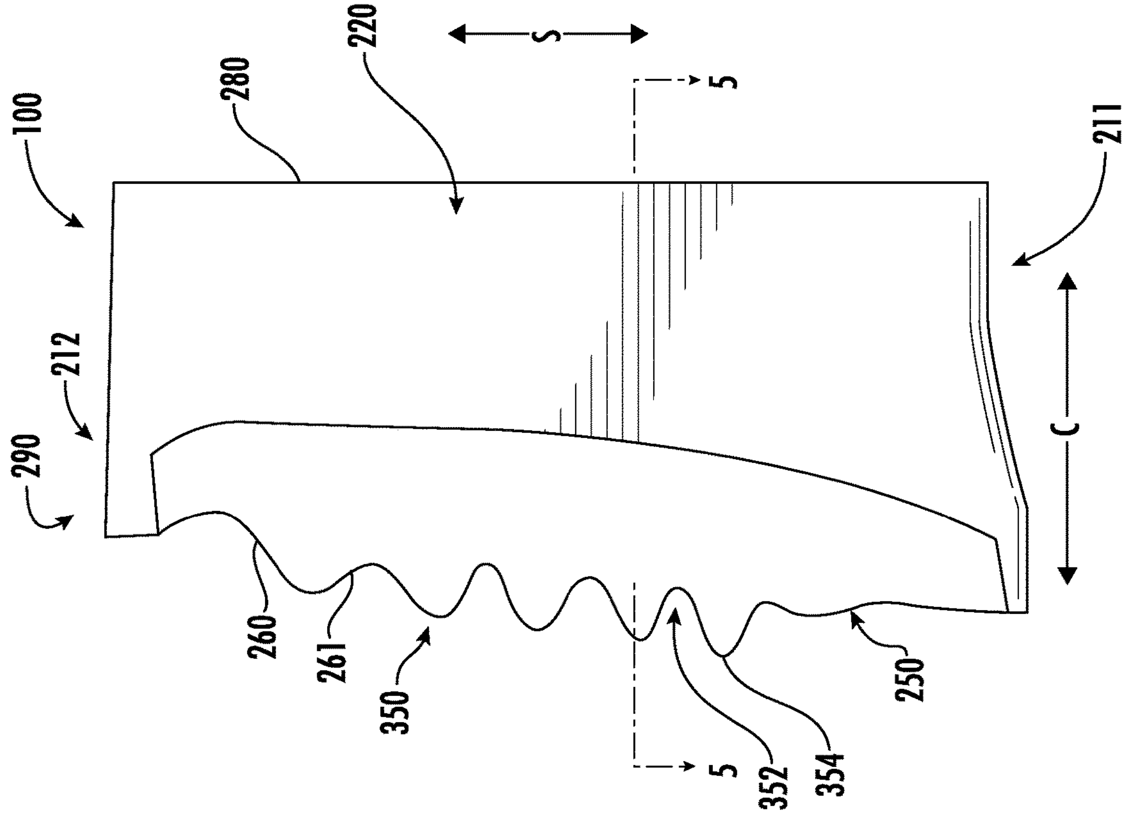
FIG. 3 is a side view of an airfoil in accordance with one or more exemplary embodiments.

Referring now to FIG. 3, a side view of another airfoil 290 in accordance with an exemplary embodiment is provided. The airfoil 290 is similar to the airfoil 200 unless otherwise noted. More specifically, FIG. 3 provides a side view of an outlet guide vane 100 of the plurality of circumferentially-spaced outlet guide vanes 52 (FIG. 1), according to another example embodiment. Like the airfoil 200 of FIG. 2, the airfoil 290 of FIG. 3, such as outlet guide vane 100, in this example defines a spanwise direction S, which may generally align with a radial direction R (FIG. 1) of a turbofan engine incorporating the airfoil 290, and a chordwise direction C, as well as a leading edge 250, and a trailing edge 280. The airfoil 290 generally includes a body 220 extending along the spanwise direction S between the root end 211 and the tip end 212 of the airfoil 290.

Referring still to FIG. 3, the airfoil 290 may include a leading edge member 260. Even though not depicted, the airfoil 200 of FIG. 2 can also include a leading edge member 260. The leading edge member 260 can be formed at least in part of a metal material and can be attached to the body 220 at a leading edge 250 of the airfoil 290, or it may be integrally formed as part of the airfoil 200 via subtractive machining or additive manufacturing or combinations thereof. As used herein, the leading edge 250 refers to the portion of the airfoil 200 that is at the foremost edge and is the portion of the airfoil 290 that first contacts oncoming air. The leading edge 250 extends from the edge and extends along up to fifty percent, such as up to thirty percent, twenty percent, such as up to ten percent, of a width of the airfoil 290 along the chordwise direction C.

Referring specifically to the exemplary embodiment of FIG. 3, the leading edge member 260 is a sculpted leading edge member 261, and the leading edge 250 is a nonlinear patterned leading edge. The sculpted leading edge member 261 may be separable from the airfoil 290 or integral with the airfoil 200. For example, for the embodiment shown, the leading edge 250 of the airfoil 290 is a waved leading edge 350 defining a plurality of peaks 354 and a plurality of valleys 352 alternatingly arranged along the spanwise direction S. The airfoil 290, which is outlet guide vane 100 in this example, may be the same, or similar to, the first guide vane 112 as described in U.S. Patent Publication No. 20220307380A1, published on Sep. 29, 2022, which is hereby incorporated by reference in its entirety. In another example, the airfoil 290, which is outlet guide vane 100 in this example, may be the same, or similar to, the airfoil as described in U.S. Pat. No. 9,249,666, which is hereby incorporated by reference in its entirety.

Figure 4:
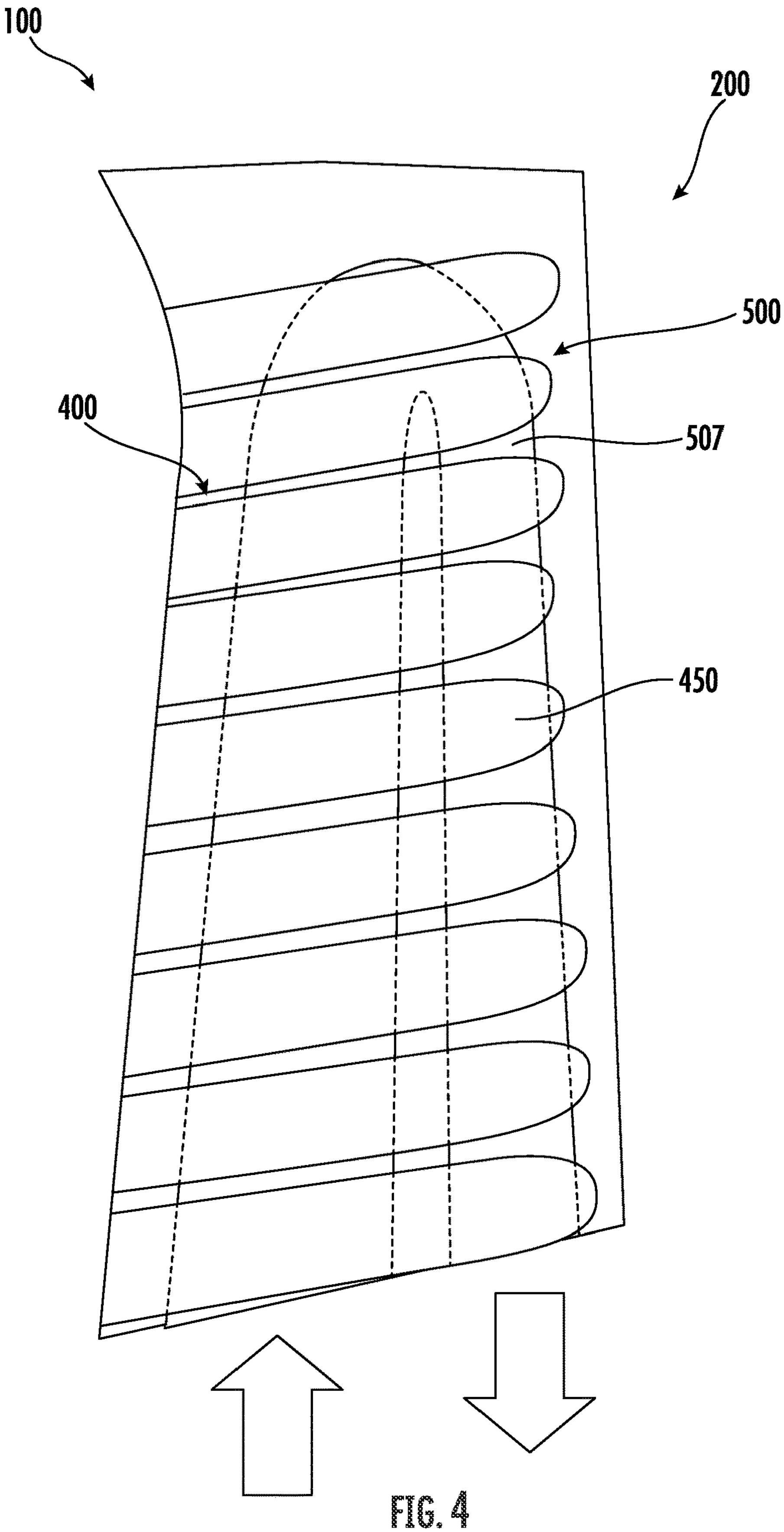
FIG. 4 is a schematic, cross-sectional, side view of an airfoil with an acoustic suppression assembly and a heat exchanger assembly in accordance with one or more exemplary embodiments.

Referring now to FIG. 4, an internal sideview of an airfoil 200 in accordance with an exemplary embodiment is provided. More specifically, FIG. 4 provides a side view an outlet guide vane 100 of the plurality of circumferentially-spaced outlet guide vanes 52 (FIG. 1), according to an example embodiment. The airfoil 200, such as the outlet guide vane 100, generally includes an acoustic suppression assembly 400 and a heat exchanger assembly 500. As appreciated herein, the acoustic suppression assembly 400 can attenuate noise from the airfoil 200 produced from operation of the turbofan engine 10 (FIG. 1) such as by causing a reduction in lower frequency noise. As also appreciated herein, the heat exchanger assembly 500 can be utilized as a cooling system for engine oil utilized in the turbofan engine 10 (FIG. 1). In combination, the acoustic suppression assembly 400 and the heat exchanger assembly 500 provide a reduced noise airfoil 200 with engine oil cooling capabilities.

Each of the acoustic suppression assembly 400 and the heat exchanger assembly 500 can be integrated into the airfoil 200 in a variety of configurations. Moreover, the respective combination of the acoustic suppression assembly 400 and the heat exchanger assembly 500 can also be combined into the airfoil 200 using a variety of integrated layouts. For illustrative purposes, exemplary acoustic suppression assemblies 400 will be described in isolation with respect to FIGS. 5-11, exemplary heat exchanger assemblies 500 will be described in isolation with respect to FIGS. 12-17, and combinations of acoustic suppression assemblies 400 and heat exchanger assemblies 500 will be described with respect to FIGS. 4 and 18-20. While specific configuration examples are provided herein for the acoustic suppression assembly 400, the heat exchanger assembly 500, and the combination thereof, it is appreciated that these are exemplary only and further variations are also contemplated within the scope of this disclosure.

With general reference to FIGS. 5-11, airfoils 200 having acoustic suppression assemblies 400 are illustrated in isolation (i.e., without illustrating the heat exchanger assemblies) for visual convenience purposes. However, these and other acoustic suppression assemblies 400 can subsequently be combined with the heat exchanger assemblies further disclosed herein.

Figure 5:
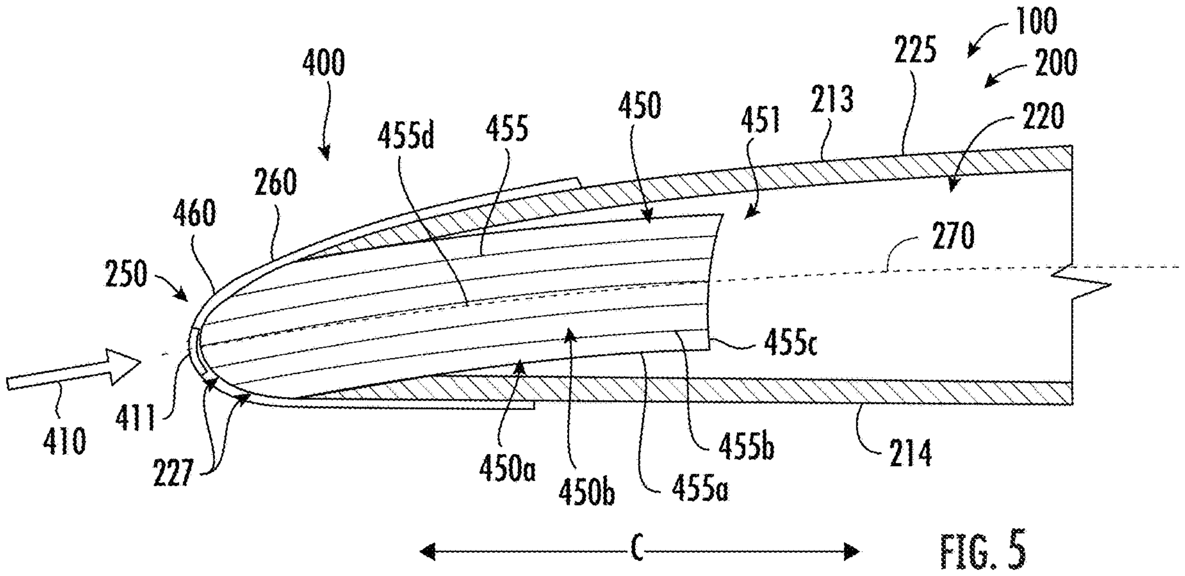
FIG. 5 is a schematic, cross-sectional, side view of an airfoil with an acoustic suppression assembly in accordance with one or more exemplary embodiments.

Referring now to FIG. 5, a cross-sectional, schematic view of an airfoil 200 with one example of an acoustic suppression assembly 400 is provided that may be used with turbofan engine 10 (shown in FIG. 1). In at least one example, the airfoil 200 of FIG. 5 is the cross-sectional view of the outlet guide vane 100 of FIG. 3 taken along line 5-5 in FIG. 3.

As best seen in this view, the body 220 of the airfoil 200 includes a plurality of acoustic cavities 451. Each acoustic cavity 450 of the plurality of acoustic cavities 451 has an inlet 227 on the airfoil 200. The inlets may be positioned at a variety of locations about the airfoil 200. In some embodiments, one or more inlets 227 may be located at or proximate the leading edge 250 of the airfoil 200. Positioning the inlets 227 of the plurality of acoustic cavities 451 near the leading edge 250 of the airfoil 200 has several benefits. For example, positioning the inlets 227 of the plurality of acoustic cavities 451 near the leading edge 250 of the airfoil 200 may increase the amount of noise attenuated by the airfoil. When the airfoil 200 is an outlet guide vane 100, positioning the inlets 227 of the plurality of acoustic cavities 451 near the leading edge 250 of the airfoil 200 reduces the noise associated with the wakes generated by the upstream fan 38 of the turbofan engine 10 impinging on the airfoil 200. However, the inlets 227 may additionally, or alternatively, be placed at other locations about the body 220 in addition to the leading the edge 250.

Each acoustic cavity 450 can extend generally parallel to a camber line 270 of the airfoil 200, which is an imaginary line that lies halfway between a suction side 213 and a pressure side 214 of the airfoil 200 and intersects the chord line (not shown) at the leading edge 250 and the trailing edge 280 (FIG. 3). As used in this context, generally parallel to the camber line 270 simply means the general direction that each of the acoustic cavities 450 extend. For example, the acoustic cavities 450 may deviate from being exactly parallel to the camber line 270 by up to ten degrees, such as up to five degrees, such as up to two degrees.

The body 220 of the airfoil 200 can include one or more cavity walls 455 that define an acoustic cavity 450. In this example, each of the acoustic cavities 450 can be defined by a first cavity wall 455*a* and a second cavity wall 455*b*, each of which can extend generally parallel to the camber line 270. Additionally, each of the acoustic cavities 450 can be further defined by a third cavity wall 455*c*. The third cavity wall 455*c* can extend generally perpendicular to and intersect with the first cavity wall 455*a* and the second cavity wall 455*b*. As such, each of the acoustic cavities 450 can be a closed cavity such that it includes an inlet 227 but does not include a separate outlet. However, it should be understood that the inlet 227 does not prevent a fluid from exiting the respective acoustic cavity 450; as such, the inlet 227 can also be an outlet for fluid to exit the acoustic cavity 450. Stated differently, each of the acoustic cavities 450 can be a space within the body 220 of the airfoil that includes a singular inlet, the inlet 227, and does not include a separate outlet or additional inlets. In other words, each of the acoustic cavities 450 can include only one orifice, which is inlet 227, and does not include any additional orifices such as additional inlets or a separate outlet.

Each of the acoustic cavities 450 can have a depth that extends generally along the chordwise direction C. Even though the depth of each of the acoustic cavities 450, as depicted in this example, is significantly less than the width of the airfoil 200 along the chordwise direction C, it should be understood that the depth of each of the cavities can be any length. For example, the depth of some, or all, of the acoustic cavities 450 can be at least five percent of the width of the airfoil 200 along the chordwise direction C and up to ninety five percent of the width of the airfoil 200 along the chordwise direction C, such as up to ten percent and up to ninety percent of the width of the airfoil 200 along the chordwise direction C, such as up to twenty percent and up to ninety percent of the width of the airfoil 200 along the chordwise direction C.

In other examples, the depth of the acoustic cavities 450 in the chordwise direction C can be greater than ninety percent. For example, each of the acoustic cavities 450 may be slanted in relation to the spanwise direction S (in and out of the page in FIG. 5), which will be explained in more detail in relation to FIGS. 6A-7B. When the acoustic cavity 450 is slanted in relation to the spanwise direction S, the depth is the length of the acoustic cavity 450 along the chordwise direction C divided by the cosine of the angle between the chordwise direction and the direction of the acoustic cavity 450. In these examples, where each of the acoustic cavities 450 are slanted in relation to the spanwise direction S, the depth can be at least five percent of the width of the airfoil 200 along the chordwise direction C and up to two hundred percent of the width of the airfoil 200 along the chordwise direction C, such as at least ten percent and up to one hundred fifty percent of the width of the airfoil 200 along the chordwise direction C, such as at least twenty percent and up to two hundred percent of the width of the airfoil 200 along the chordwise direction C, such as at least seventy percent and up to two hundred percent of the width of the airfoil 200 along the chordwise direction C, such as at least ninety percent and up to two hundred percent of the width of the airfoil 200 along the chordwise direction C.

In yet another example, the depth of the acoustic cavities 450 in the chordwise direction C can be greater than ninety percent. For example, each of the acoustic cavities 450 may deviate from extending in a singular direction. More specifically, which will be explained in more detail in relation to FIG. 6A-6C, the acoustic cavities 450 can be J-shaped, U-shaped, or serpentine-shaped. In the examples where each of the acoustic cavities 450 deviate from extending in a singular direction, the depth can be an effective depth. The effective depth can be at least ninety percent of the width of the airfoil 200 along the chordwise direction and up to one thousand five hundred percent of the width of the airfoil 200 along the chordwise direction, such as at least one hundred percent of the width of the airfoil 200 along the chordwise direction and up to one thousand five hundred percent of the width of the airfoil 200 along the chordwise direction, such as at least one hundred fifty percent of the width of the airfoil 200 along the chordwise direction and up to one thousand five hundred percent of the width of the airfoil 200 along the chordwise direction, such as at least three hundred percent of the width of the airfoil 200 along the chordwise direction and up to one thousand five hundred percent of the width of the airfoil 200 along the chordwise direction, such as at least four hundred percent of the width of the airfoil 200 along the chordwise direction and up to one thousand five hundred percent of the width of the airfoil 200 along the chordwise direction.

Each of the cavity walls 455 can be a continuous surface so that fluid within each of the acoustic cavities 450 is prevented from flowing to another and separate acoustic cavity 450. Stated differently, each of the cavity walls 455 can be impermeable. For example, the second cavity wall 455*b* may prevent the fluid within a first acoustic cavity 450*a* from flowing to a second acoustic cavity 450*b*, as such, the second cavity wall 455*b* is impermeable.

The distance between adjacent cavity walls 455, such as first cavity wall 455*a* and second cavity wall 455*b* can be greater than 0.25 millimeter and up to twenty millimeters, such as greater than 0.25 millimeter and up to ten millimeters. Some of the cavity walls 455, such as the second cavity wall 455*b*, can be positioned between adjacent acoustic cavities 450, such as the first acoustic cavity 450*a* and the second acoustic cavity 450*b*. The cavity walls 455 that are positioned between adjacent acoustic cavities 450, such as the cavity wall 455*b*, can be relatively thin, such as less than three millimeters thick, such as less than two millimeters thick, such as less than one millimeter thick.

One of the cavity walls 455 can be positioned on the camber line 270 of the airfoil 200. In this example, a fourth cavity wall 455*d* is positioned on the camber line 270 of the airfoil 200. The cavity wall 455 that is positioned on the camber line 270 of the airfoil 200 may also be located in line with a streamline 410 at the leading edge stagnation point 411 of the airfoil 200. The leading edge stagnation point 411 of the airfoil 200 is a point in a flow field around the airfoil 200 where the local velocity of the fluid is zero.

In this example, the leading edge stagnation point 411 of the airfoil 200 is at the location where the camber line 270 intersects with the leading edge 250 of the airfoil 200. However, it should be understood that if the airfoil 200 had a larger angle of attack, the leading edge stagnation point 411 may move down towards the pressure side 214 of the airfoil 200. As such, in other examples, one of the cavity walls 455, such as the fourth cavity wall 455*d*, can be positioned on the leading edge stagnation point 411. Aligning one of the cavity walls 455, such as the fourth cavity wall 455*d*, with the leading edge stagnation point 411 of the airfoil 200 and/or the camber line 270 of the airfoil 200 may have the benefit of maintaining the net aerodynamic loading of the airfoil 200.

In some examples, the cavity walls 455 can be produced using additive manufacturing technology, which may allow for certain geometries or features described herein to be produced, which may provide for reduced noise. Additionally, or in the alternative, a cavity wall 455 may be integrally formed with another cell wall or with the body 220 of the airfoil 200.

As also seen in this view, the airfoil 200 includes a porous face sheet 460 positioned along the leading edge 250 of the body 220 of the airfoil 200. The porous face sheet 460, which will be explained further, can be a perforated surface of the airfoil 200 or a perforated component that is separate from the body 220. The porous face sheet 460 can be a microperforated surface and/or can be a mesh formed from, for example, wire, cloth, fibers, and/or filaments, or a combination thereof. The porous face sheet 460 can have a thickness that is greater than 0.5 millimeter thick and less than three millimeters thick, such as greater than 0.5 millimeter thick and less than two millimeters thick. The porous face sheet 460 can have a plurality of holes, each hole having a diameter of less than one millimeter, such as less than 0.5 millimeter.

The porous face sheet 460 can be positioned on the inlet 227 of at least one of the acoustic cavities 450. In this example, the porous face sheet 460 is positioned on each inlet 227 of each acoustic cavity 450 of the plurality of acoustic cavities 451. The porous face sheet 460 can extend a length of up to fifty percent of the chord length of the airfoil 200, such as up to thirty percent of the chord length of the airfoil 200, such as up to twenty percent of the chord length of the airfoil 200, such as up to ten percent of the chord length of the airfoil 200. In some examples, the porous face sheet 460 can extend further, partially or along the full length of the chord length of the airfoil 200, such that it extends further partially or completely over the pressure side 214 and/or the suction side 213 of the airfoil 200. In yet other examples, the porous face sheet 460 can extend across a majority of the chord length of the airfoil 200, such as at least fifty percent of the chord length of the airfoil 200 and up to ninety nine percent of the chord length of the airfoil, such as at least sixty percent of the chord length of the airfoil 200 and up to eighty percent of the chord length of the airfoil.

Positioning the porous face sheet 460 on the inlet of the acoustic cavities 450 has several benefits. For example, in some embodiments, placing the inlet 227 of the acoustic cavities 450 on the leading edge 250 of the airfoil 200 can help increase the amount of noise attenuated by the airfoil 200. However, the inlet 227 of the acoustic cavities 450 on the leading edge 250 may reduce the aerodynamic performance of the airfoil 200. As such, the porous face sheet 460 may also improve the aerodynamic performance of the airfoil 200 while also benefiting, at least partially, from the noise attenuation achieved by the acoustic cavities 450 on the leading edge 250 of the airfoil 200. Moreover, a portion of the leading edge 250 may remain non-porous to further improve aerodynamic performance while still including a porous face sheet 460 adjacent to the non-porous portion.

As mentioned, the porous face sheet 460 can be a perforated surface of the airfoil 200, such as a microperforated surface. As shown, the porous face sheet 460 is a separate component and is placed, such as bonded, on top of a skin 225 of the airfoil 200 and is not flush with the skin 225 of the airfoil 200. However, in some examples, the porous face sheet 460 may also be aligned with the skin 225 of the airfoil 200 so that it sits flush with the skin 225 of the airfoil 200. In yet other examples, the porous face sheet 460 is monolithic with at least a portion of the skin 225 of the airfoil 200 and is a perforated portion of the skin 225 of the airfoil 200. For example, the porous face sheet 460 can be formed integrally with the airfoil 200 by laser drilling, additive manufacturing, etc. In yet other examples, the porous face sheet 460 is a perforated metal leading edge member 260 as described in reference to FIG. 3.

The skin 225 of the airfoil 200 can be manufactured from a composite or metal material. The term "composite material" as used herein may be defined as a material containing a reinforcement such as fibers or particles supported in a binder or matrix material. Composite materials include metallic and non-metallic composites. One useful embodiment for composite airfoils is made of a unidirectional tape material and an epoxy resin matrix. The composite airfoils 200 disclosed herein may include composite materials of the non-metallic type made of a material containing a fiber such as a carbonaceous, silica, metal, metal oxide, or ceramic fiber embedded in a resin material such as Epoxy, PMR15, BMI, PEEU, etc. A more particular material includes fibers unidirectionally aligned into a tape that is impregnated with a resin, formed into a part shape, and cured via an autoclaving process or press molding to form a lightweight, stiff, relatively homogeneous article having laminates within. However, any suitable composite material and/or formation process may be used.

The porous face sheet 460 and/or the skin 225 of the airfoil 200 can be manufactured from a metal material such as titanium, steel, or aluminum. The porous face sheet 460 can have a porosity of up to thirty percent porosity, such as less than twenty percent porosity, such as less than ten percent porosity. Having a reduced porosity, such as less than thirty percent, can increase the airfoil 200's resistance to mean flow while increasing the ability of the airfoil 200 to attenuate noise. In at least one example, a separate wire mesh cover sheet (not shown) is positioned over the porous face sheet 460 to increase surface resistance.

In some examples, the porous face sheet 460 may extend the full length of the airfoil 200 along the spanwise direction S (FIG. 2 and FIG. 3). However, in some examples, the porous face sheet 460 may extend only up to ninety percent, such as up to eighty percent, such as up to seventy percent, of the length of the airfoil 200 along the spanwise direction. However, in some examples, which will be explained further, the porous face sheet 460 may be selectively positioned on the airfoil 200 and separate portions may only extend less than ten percent, such as less than five percent, of the length of the airfoil 200 along the spanwise direction.

Figure 6A:
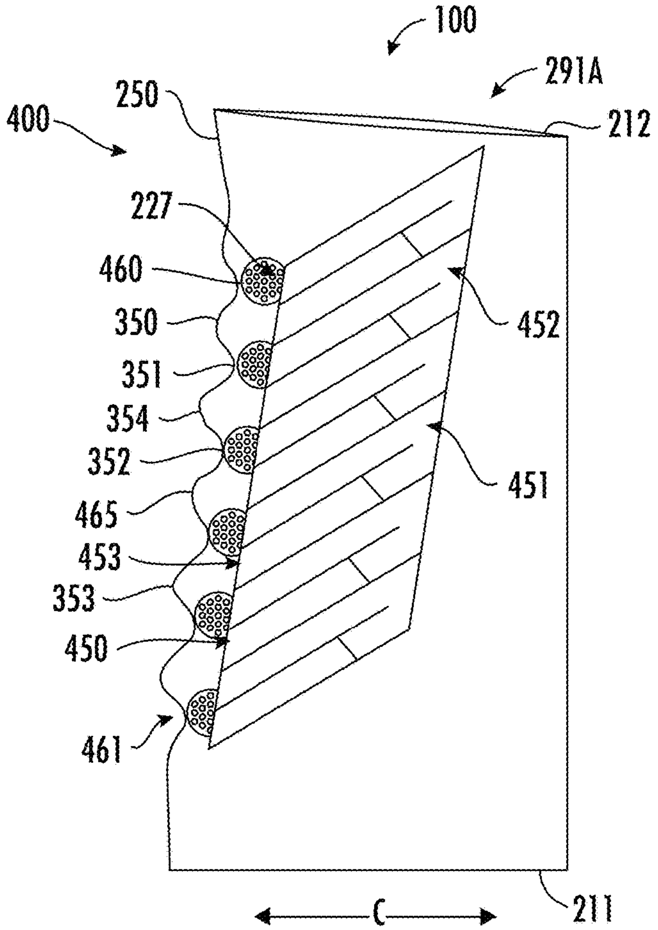
FIG. 6A is a schematic, cross-sectional, side view of an airfoil with an acoustic suppression assembly in accordance with one or more exemplary embodiments.

Referring now to FIG. 6A, a schematic, cross-sectional, side view of an airfoil 291A in accordance with an exemplary embodiment is provided. The airfoil 291A is similar to the airfoil 200 unless otherwise noted. More specifically, FIG. 6A provides a schematic, cross-sectional, side view of an outlet guide vane 100 of the plurality of circumferentially-spaced outlet guide vanes 52 (FIG. 1), according to an example embodiment. In this example, the leading edge 250 is a waved leading edge 350 defining a plurality of peaks 354 and a plurality of valleys 352 alternatingly arranged along the spanwise direction S. As used herein, the term "peak" refers to a convex surface of the waved leading edge 350 and the term "valley" refers to a concave or saddle surface of the waved leading edge 350.

In this example, the airfoil 291A includes a plurality of porous face sheets 461. Even though each of the porous face sheets 461 are depicted circular, it should be understood that the depiction is a schematic representation and that the porous face sheets 461 may be any shape including circular, but can also be square shaped, oval shaped, or an irregular shape, to name a few examples. Each of the porous face sheets 460 of the plurality of porous face sheets 461 can be positioned in a valley 351 of the plurality of valleys 352 of the waved leading edge 350. In some examples, and as shown, each peak 353 of the plurality of peaks 354 of the waved leading edge 350 do not include a porous face sheet 460. As such, each peak 353 of the plurality of peaks 354 of the waved leading edge 350 includes an impermeable portion 465, in some examples, and as shown.

In some examples, each acoustic cavity 450 can be the same or similar to a resonant cell 206 of U.S. application Ser. No. 16/938,150, filed on Jul. 24, 2020 and published as U.S. Patent Publication No. 20220025814A1 on Jan. 27, 2022, which is hereby incorporated by reference in its entirety. In some examples, the acoustic cavities 450 are grouped, forming cavity groups 453. The term "cavity group" refers to a plurality of acoustic cavities 451 that are matched or grouped with one another in a pattern that repeats across at least a portion of the airfoil 200. For example, and as depicted in FIG. 6A, each of the acoustic cavities 450 can be an oblique cavity 452 and can be the same, or similar to, the oblique resonant cell 1300 that forms a resonant cell group 1200 as depicted in FIG. 13A of U.S. application Ser. No. 16/938,150.

Incorporating oblique cavities 452 into the airfoil 291A may have several advantages. For example, the depth of the acoustic cavities 450 is limited by the width of the airfoil 200 along the chordwise direction. As such, to increase the maximum depth of the acoustic cavities 450, it may be necessary to angle the acoustic cavities 450 in relation to the chord wise direction C. Increasing the maximum depth of the acoustic cavities 450 allows for reduction in lower frequency noise. As a person of skill in the art would recognize, the depth of the acoustic cavities 450 are adjusted, or tuned, to attenuate certain frequencies. In some examples, the tuned depth of the acoustic cavities 450 may be approximately one fourth of the wavelength of the frequency that is desired to be attenuated.

In this example, each acoustic cavity 450 within each cavity group 453 can define an inlet 227 that is within a valley 351 of the plurality of valleys 352, the inlet 227 being adjacent to a porous face sheet 460 such that the porous face sheet 460 at least partially covers the inlet 227. Also, as mentioned, the area within the peaks 354 may be impermeable. This configuration may have several benefits. For example, most of the noise penalties caused by the airfoil 291A may be in the valleys 352. As such, it may be beneficial to include the porous face sheets 460 at only each valley 351 of the plurality of valleys 352 to decrease the amount of noise generated by the airfoil 291A while also decreasing the amount of surface area that includes the porous face sheet 460. Decreasing the amount of surface area of the airfoil 291A that includes the porous face sheet 460 may reduce the aerodynamic drag of the airfoil 291A.

Figure 6B:
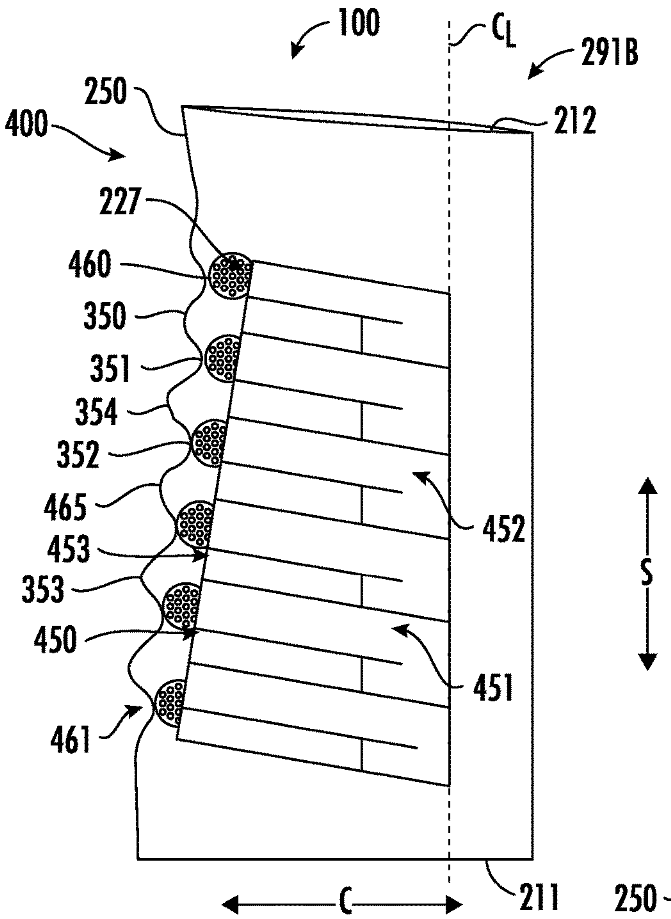
FIG. 6B is a schematic, cross-sectional, side view of an airfoil with an acoustic suppression assembly in accordance with one or more exemplary embodiments.

Referring now also to FIG. 6B, a schematic, cross-sectional, side view of an airfoil 291B in accordance with an exemplary embodiment is provided. The airfoil 291B is similar to the airfoil 200 unless otherwise noted. More specifically, FIG. 6A provides a schematic, cross-sectional, side view of an outlet guide vane 100 of the plurality of circumferentially-spaced outlet guide vanes 52 (FIG. 1), according to an example embodiment. The airfoil 200 of FIG. 6B similar to the airfoil 200 of FIG. 6A, except in this example, each of the cavity groups 453 can extend to the same chordwise location CL, whereas in the example of FIG. 6A, each of the cavity groups 453 extended the same length across the chord. Additionally, in this example, each of the cavity groups 453 are slanted downward, pointing toward the root end 211 of the airfoil 291B. Slanting the cavity groups 453 downward may result in the longest cavities being near the tip end 212 and the shortest cavities near the root end 211 of the airfoil. This may be beneficial to noise attenuation because of how the acoustic sources are weighted.

Figure 6C:
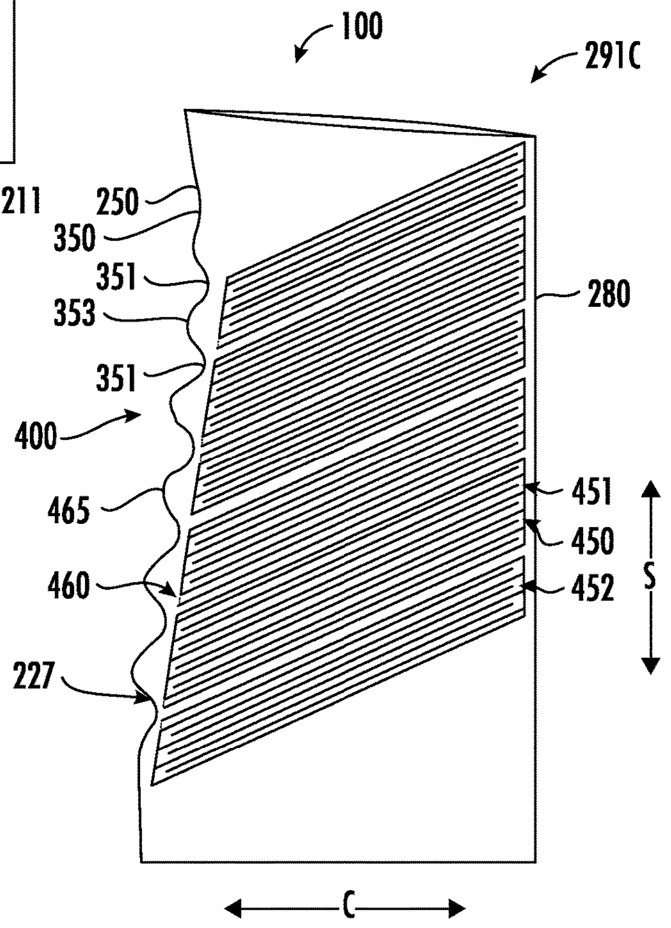
FIG. 6C is a schematic, cross-sectional, side view of an airfoil with an acoustic suppression assembly in accordance with one or more exemplary embodiments.

Referring now also to FIG. 6C, a schematic, cross-sectional, side view of an airfoil 200 in accordance with an exemplary embodiment is provided. The airfoil 291C is similar to the airfoil 200 unless otherwise noted. More specifically, FIG. 6C provides a schematic, cross-sectional, side view of an outlet guide vane 100 of the plurality of circumferentially-spaced outlet guide vanes 52 (FIG. 1), according to an example embodiment. The airfoil 291C of FIG. 6C can be the same, or similar to, the airfoil 200 of FIG. 6A or FIG. 6B. However, in this example, the airfoil 291C includes a plurality of acoustic cavities 451 that are each serpentine-shaped. As shown, each of the acoustic cavities 450 have an inlet 227 that is located near a valley 351 of the leading edge 250 and at an end of the serpentine shaped cavity 451. In this example, each of the plurality of acoustic cavities 450 are closed cavities such that the inlet 227 is the only inlet for the serpentine-shaped cavity 451. In other words, each of the plurality of acoustic cavities 450 can be a space within the body 220 of the airfoil 291C that includes the inlet 227, which is the only inlet for the serpentine-shaped cavity 451.

Figure 6D:
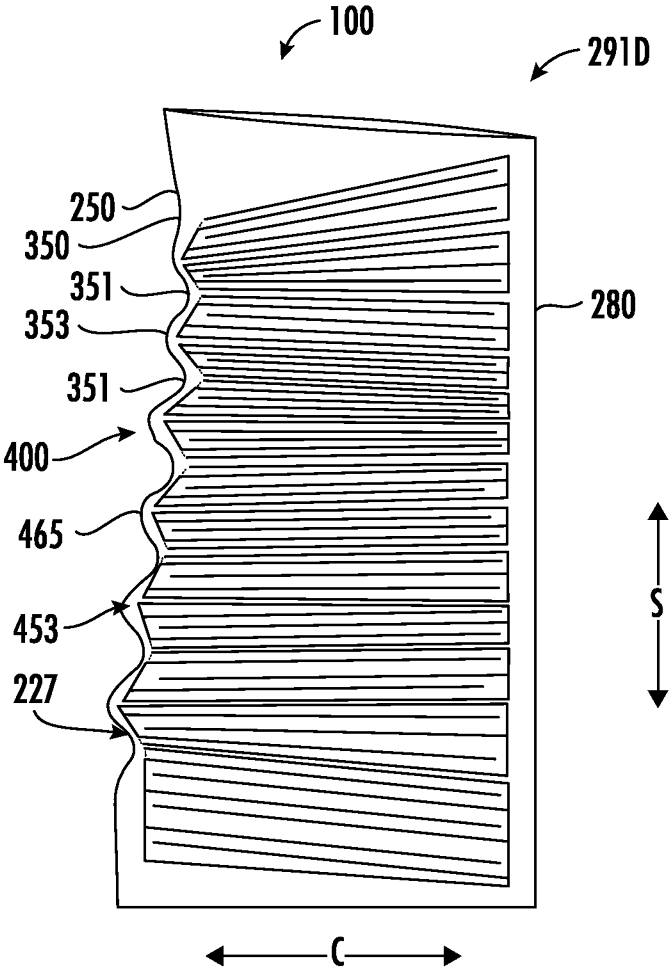
FIG. 6D is a schematic, cross-sectional, side view of an airfoil with an acoustic suppression assembly in accordance with one or more exemplary embodiments.

Referring now also to FIG. 6D, a schematic, cross-sectional, side view of an airfoil 200 in accordance with an exemplary embodiment is provided. The airfoil 291D is similar to the airfoil 200 unless otherwise noted. More specifically, FIG. 6D provides a schematic, cross-sectional, side view of an outlet guide vane 100 of the plurality of circumferentially-spaced outlet guide vanes 52 (FIG. 1), according to an example embodiment. The airfoil 291D of FIG. 6D can be the same, or similar to, the airfoil 200 of FIG. 6C. However, in this example, each of the cavity groups 453 can conform to the shape of the leading edge 250. The shape of each of the cavity groups 453 can be, as shown, irregular and/or different than the shape of some of the other cavity groups 453 within the airfoil 291D. The cavity groups 453 may comprise a serpentine configuration as illustrated. The serpentine configurations can provide an extended passage for a longer treatment, such as, for example, at acoustically sensitive portions of the airfoil 291D (e.g., near the valley 351). The serpentine configurations can also extend into adjacently quieter portions of the airfoil 200 (e.g., near the peaks 353) to extend the treatment length by utilizing less acoustically sensitive portions of the airfoil 291D.

Figure 7A:
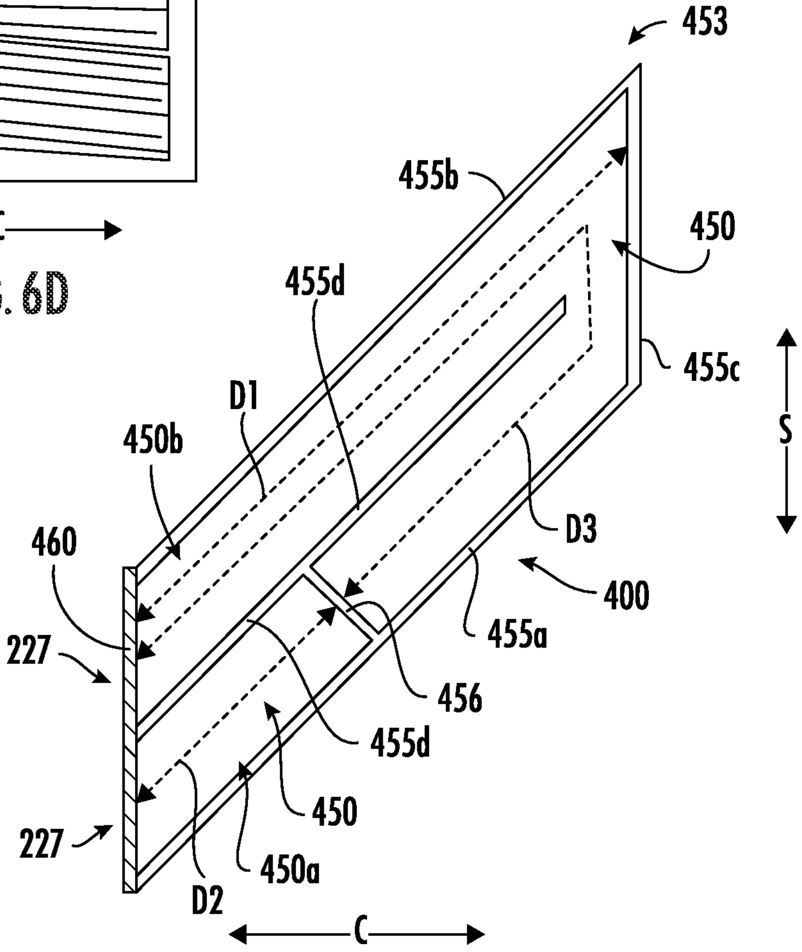
FIG. 7A is a schematic, cross-sectional, side view of a cavity group such as for the airfoils of FIG. 6A, FIG. 6B, FIG. 6C, or FIG. 6D in accordance with one or more exemplary embodiments.

Referring now also to FIG. 7A, a schematic, cross-sectional, side view of a cavity group 453, such as for use in any of the airfoils 291A-291D of FIGS. 6A-6D, in accordance with an exemplary embodiment is provided. As mentioned, the cavity group 453 includes a plurality of acoustic cavities 450. In this example, the cavity group 453 includes a first acoustic cavity 450*a* and a second acoustic cavity 450*b*, a depth D2 of the first acoustic cavity 450*a* can be different than a depth D1 of the second acoustic cavity 450*b*. For example, the depth D2 of the first acoustic cavity 450*a* can differ from the depth D1 of the second acoustic cavity 450*b* by at least five percent and up to two thousand percent, such as at least five percent and up to fifteen hundred percent, such as at least five percent and up to one thousand percent, such as at least five percent and up to five hundred percent (calculated by (D1−D2)/D2). In this example, depth D1 is the distance from the interior surface of the porous face sheet 460 to the interior surface of the third cavity wall 455*c* and depth D2 is the distance from the interior surface of the porous face sheet 460 to an interior surface of the partition 456. Also in this example, the second acoustic cavity 450*b* includes an effective depth D3 due to the "J" shape of the second acoustic cavity 450*b*. Depth D3 is the distance of the J-shaped path from the porous face sheet 460 to the partition 456. The effective depth D3 of the second acoustic cavity 450*b* can differ from the depth D2 of the first acoustic cavity 450 by at least five percent and up to four thousand percent, such as at least five percent and up to fifteen hundred percent, such as at least five percent and up to one thousand percent, such as at least five percent and up to five hundred percent (calculated by (D3−D2)/D2).

Having differing depths of the plurality of acoustic cavities 451 has several benefits. For example, the depth of each acoustic cavity 450 may be tuned or configured to attenuate specific frequency sound waves. For example, the first acoustic cavity 450*a* may be tuned and/or configured to attenuate high-frequency sound waves, whereas the second acoustic cavity 450*b* may be tuned and/or configured to attenuate low-frequency sound waves and/or intermediate frequency sound waves. In at least one example, the depth of each acoustic cavity 450 may be tuned or configured to attenuate specific frequency sound waves by adjusting the depth of each acoustic cavity 450 to be approximately one fourth of the wavelength of the frequency that is desired to be attenuated.

As mentioned, in this example, the second acoustic cavity 450*b* is shaped like the letter "J", whereas the first acoustic cavity 450*a* extends from the hook of the second acoustic cavity 450*b* to the porous face sheet 460. Each of the plurality of acoustic cavities 450, in this example the first acoustic cavity 450*a* and the second acoustic cavity 450*b*, includes an inlet 227. One of the porous face sheets 460 of the plurality of porous face sheets 461 (FIG. 6A—FIG. 6C) can be positioned on the inlet 227 of each acoustic cavity 450. In this example, the porous face sheet 460 is positioned on the inlet 227 of both the first acoustic cavity 450*a* and the second acoustic cavity 450*b*. As shown, the first acoustic cavity 450*a* can be defined by a first cavity wall 455*a*, a fourth cavity wall 455*d*, and a partition 456; the second acoustic cavity 450*b* can be defined by the first cavity wall 455*a*, a second cavity wall 455*b*, a third cavity wall 455*c*, the fourth cavity wall 455*d*, and the partition 456. As shown, the partition 456 is integrally formed with or connected to the fourth cavity wall 455*d* and the first cavity wall 455*a* and serves to fluidly separate the first acoustic cavity 450*a* from the second acoustic cavity 450*b*. However, in some examples, the partition 456 can include apertures to fluidly connect the first acoustic cavity 450*a* to the second acoustic cavity 450*b*. As shown, cavity walls 455*a*, 455*b*, and 455*d*, and the partition 456 can be oriented obliquely relative to the spanwise direction S and the chordwise direction C. The third cavity wall 455*c* can be generally parallel to the spanwise direction S.

Figure 7B:
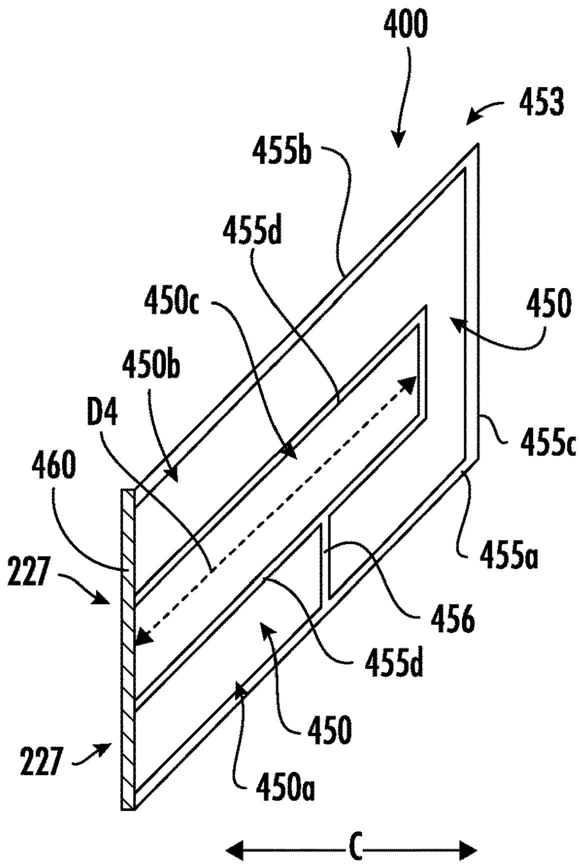
FIG. 7B is a schematic, cross-sectional, side view of a cavity group such as for the airfoils of FIG. 6A, FIG. 6B, FIG. 6C, or FIG. 6D in accordance with one or more exemplary embodiments.

Referring now also to FIG. 7B, a schematic, cross-sectional, side view of a cavity group 453, such as for use in any of the airfoils 291A-291D of FIGS. 6A-6D, in accordance with an exemplary embodiment is provided. The cavity group 453 of FIG. 7B can be similar to the cavity group 453 of FIG. 7A. However, in this example, the cavity group 453 includes a third acoustic cavity 450*c* that is positioned between the first acoustic cavity 450*a* and the second acoustic cavity 450*b*. Additionally, the partition 456 may extend in the spanwise direction S, instead of extending perpendicular to cavity walls 455*a* and 455*d*, as depicted in FIG. 7A.

Figure 7C:
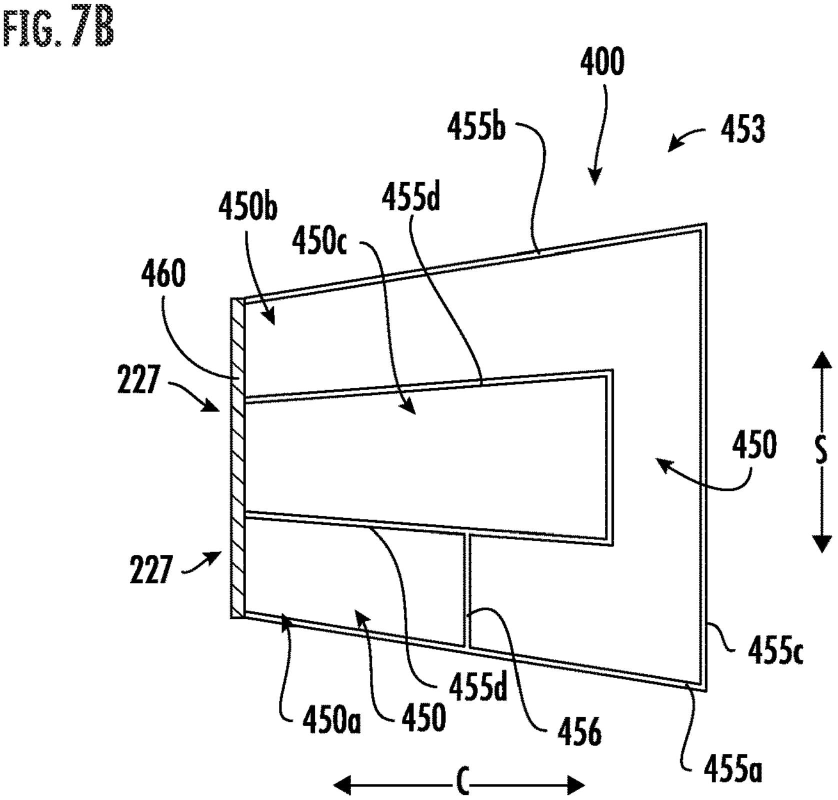
FIG. 7C is a schematic, cross-sectional, side view of a cavity group such as for the airfoils of FIG. 6A, FIG. 6B, FIG. 6C, or FIG. 6D in accordance with one or more exemplary embodiments.

Referring now also to FIG. 7C, a schematic, cross-sectional, side view of a cavity group 453, such as for use in any of the airfoils 291A-291D of FIGS. 6A-6D, in accordance with an exemplary embodiment is provided. The cavity group 453 of FIG. 7C can be similar to the cavity group 453 of FIG. 7B. However, in this example, cavity wall 455*a* and cavity wall 455*b* both extend away from the third acoustic cavity 450*c*.

The cavity group 453 as described in reference to FIG. 7A, FIG. 7B, or FIG. 7C can have any number of acoustic cavities 450. For example, each cavity group 453 can have four, five, or six cavities. In yet other examples, each cavity group 453 can have seven or more cavities, such as up to ten cavities.

Figure 8:
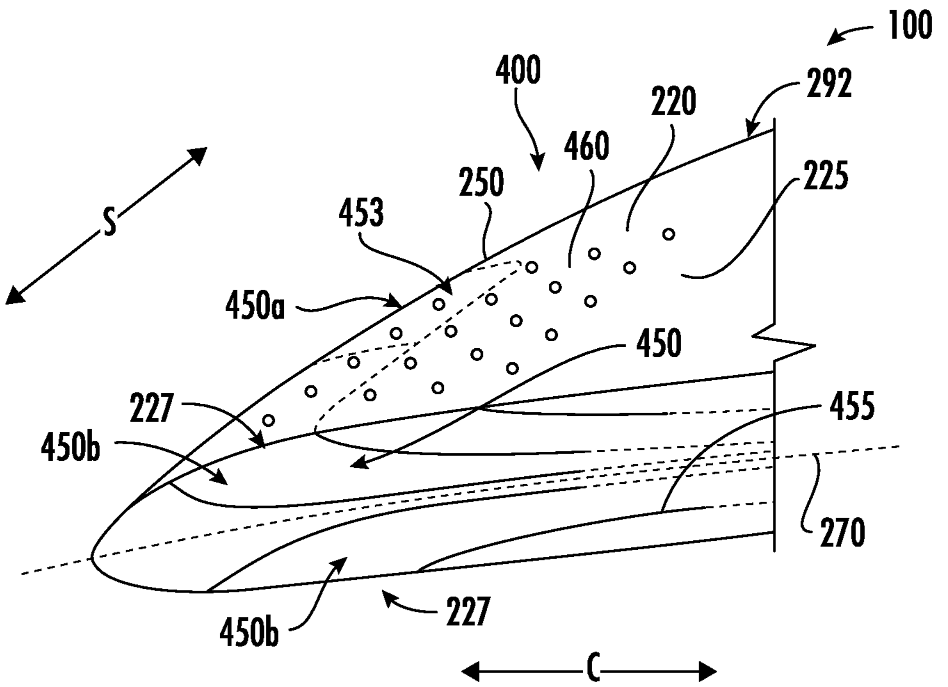
FIG. 8 is a cross-sectional, perspective view of an airfoil with an acoustic suppression assembly in accordance with one or more exemplary embodiments.

Referring now to FIG. 8, a cross-sectional, perspective view of an airfoil 292 in accordance with an exemplary embodiment is provided. The airfoil 292 is similar to the airfoil 200 unless otherwise noted. More specifically, FIG. 8 provides a cross-sectional, perspective view of an outlet guide vane 100 of the plurality of circumferentially-spaced outlet guide vanes 52 (FIG. 1), according to an example embodiment. In the example of FIG. 8, the airfoil 292 includes a cavity group 453, which includes a first acoustic cavity 450*a* and a second acoustic cavity 450*b*. In some examples, the cavity walls 455 defining the cavity groups 453 can be oriented obliquely in relation to the chordwise direction C and the spanwise direction S. As best seen in this example, the inlet 227 of each acoustic cavity 450 may not be linearly shaped. Instead, and as depicted, the inlet 227 may slope away from the camber line 270 of the airfoil 200 to extend toward the skin 225 of the body 220 of the airfoil 200.

Figure 9:
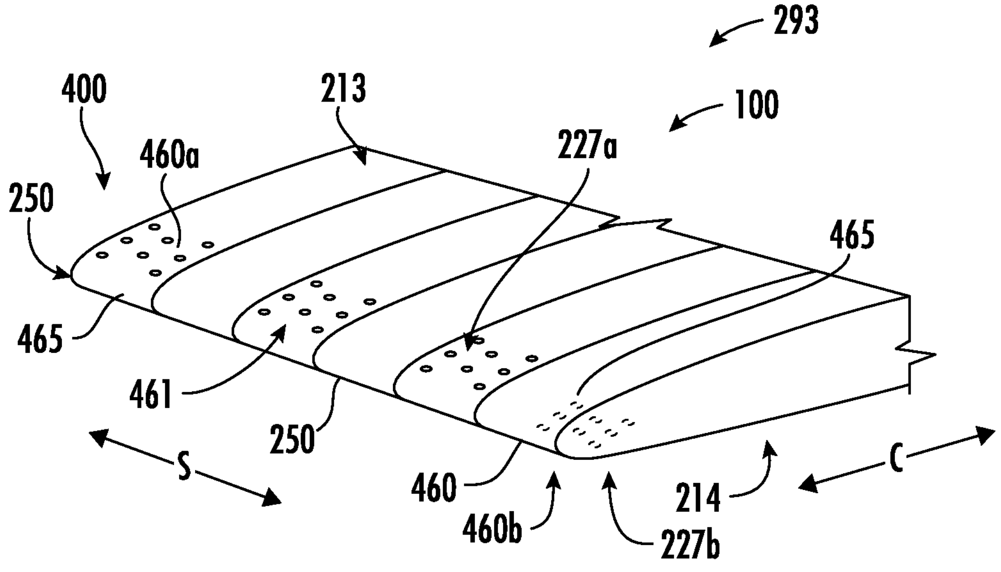
FIG. 9 is a cross-sectional, perspective view of an airfoil with an acoustic suppression assembly in accordance with one or more exemplary embodiments.

Referring now to FIG. 9, a cross-sectional, perspective view of an airfoil 293 in accordance with an exemplary embodiment is provided. The airfoil 293 is similar to the airfoil 200 unless otherwise noted. More specifically, FIG. 9 provides a cross-sectional, perspective view of an outlet guide vane 100 of the plurality of circumferentially-spaced outlet guide vanes 52 (FIG. 1), according to an example embodiment. In this example, the airfoil 293 includes a plurality of porous face sheets 461. The plurality of porous face sheets 461 include at least one pressure side porous face sheet 460*b* and at least one suction side porous face sheet 460*a*. The pressure side porous face sheets 460*b* are located on the pressure side 214 of the airfoil 293 and the suction side porous face sheets 460*a* are located on the suction side 213 of the airfoil 293. The plurality of porous face sheets 461 alternate between pressure side porous face sheets 460*b* and suction side porous face sheets 460*a* along the spanwise direction S of the airfoil 293. As such, at least one of the pressure side porous face sheets 460*b* are positioned adjacent to a suction side porous face sheets 460*a* along the spanwise direction S.

Additionally, and as shown, impermeable portions 465 are positioned between adjacent porous face sheets 460 along the spanwise direction S. Stated differently, each of the porous face sheets 460 are positioned adjacent to an impermeable portion 465 along the spanwise direction S. As shown, the impermeable portions 465 are positioned adjacent to one of the porous face sheets 460 along the chordwise direction C. The placement of each of the porous face sheets 460 and each of the impermeable portions 465 can be defined according to the radial mode shapes of the dominant acoustic tones of interest for attenuation. By discretely treating some portions of the airfoil 293 and not others, with reference to the radial mode shapes of the key acoustic modes of interest in the fan duct, increased noise cancelation (i.e., destructive interference) may be attained while partitioning the treatment according to the restricted volume enclosed by the airfoil 293 (alternating between suction side and pressure side treatment e.g.).

Although not depicted in this view, the airfoil 293 can include suction side cavities and pressure side cavities. The suction side cavities can include a suction side inlet 227*a* and the pressure side cavities can include a pressure side inlet 227*b*. The suction side cavities and the pressure side cavities can be oriented obliquely relative to the spanwise direction S and/or the chordwise direction C, as described in reference to FIG. 6A.

Alternating between suction side acoustic cavities and pressure side acoustic cavities has several benefits. For example, this configuration may increase the discretizing of the acoustic response in the spanwise direction to optimize the destructive interference associated with radiated noise by referencing the radial mode shapes and noise source distribution of the dominant noise tones of interest. Additionally, this configuration may increase the overall smoothness of the leading edge 250 of the airfoil 200, which may decrease aerodynamic drag.

Referring briefly back to also FIG. 6A, FIG. 6B, or FIG. 6C, each of the porous face sheets 460 of the plurality of porous face sheets 461 can be located in a valley 351 of the plurality of valleys 352 of the waved leading edge 350. In some examples, and as shown, each peak 353 of the plurality of peaks 354 of the waved leading edge 350 does not include a porous face sheet 460 and instead includes an impermeable portion 465. Also, in some examples, the porous face sheets 460 are only located on a suction side 213 or a pressure side 214 of the airfoil 200. As such, the other of the suction side 213 or the pressure side 214 of the airfoil 200 includes only the impermeable portion 465. Including the porous face sheet 460 on only one of the suction side 213 or the pressure side 214 of the airfoil (FIG. 1) may reduce the amount of aerodynamic drag experienced from the porous face sheet 460.

Figure 10:
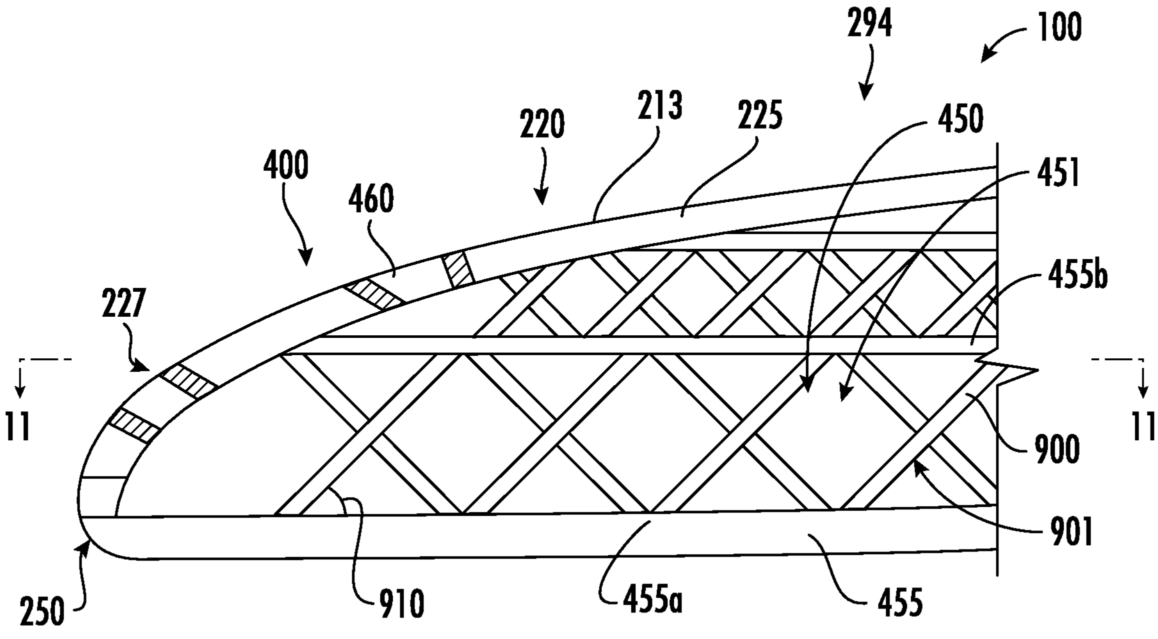
FIG. 10 is a cross-sectional, perspective view of an airfoil with an acoustic suppression assembly in accordance with one or more exemplary embodiments.
Figure 11:
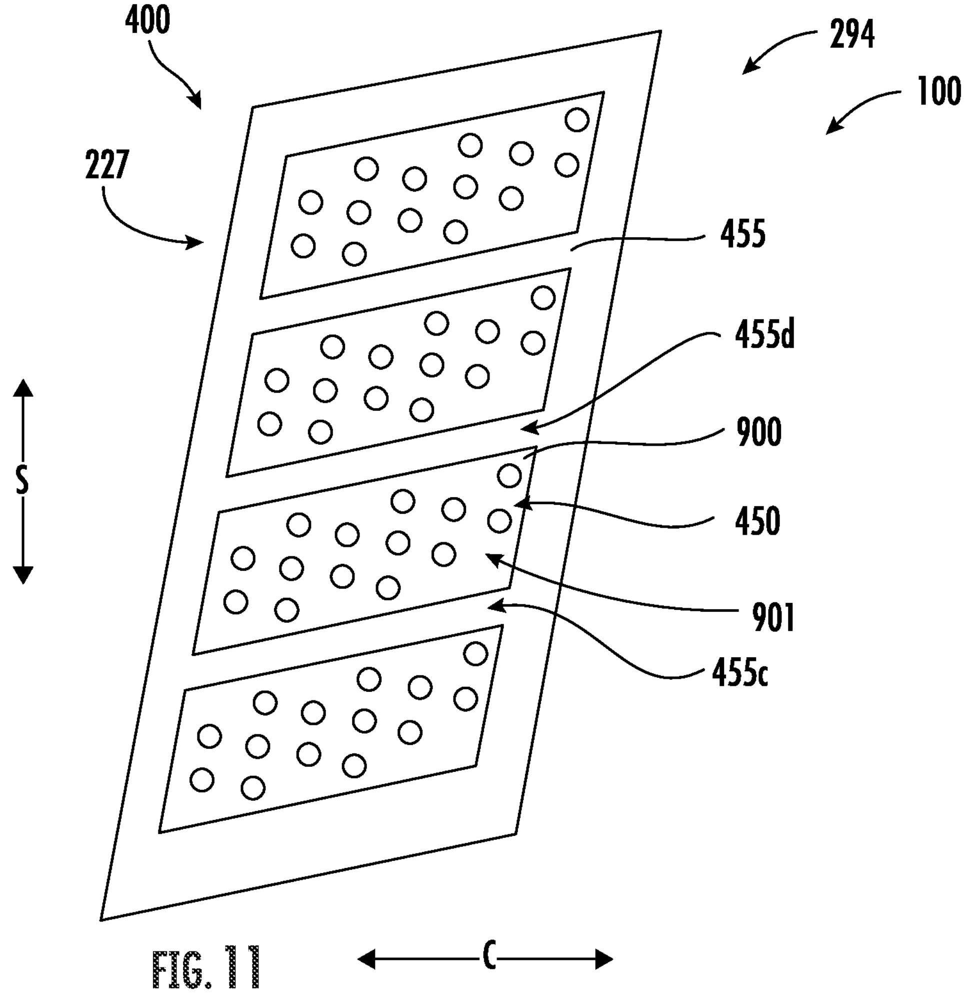
FIG. 11 is a cross-sectional, top view of the airfoil of FIG. 10 in accordance with one or more exemplary embodiments.

Referring now to FIG. 10 and FIG. 11, FIG. 10 depicts a cross-sectional, side view of an airfoil 294, in accordance with an exemplary embodiment, and FIG. 11 depicts a cross-sectional, top view of the airfoil 294 of FIG. 10, along line 11-11 of FIG. 10, in accordance with an exemplary embodiment. Airfoil 294 is similar to the airfoil 200 unless otherwise noted. More specifically, FIG. 10 depicts a cross-sectional, side view of an outlet guide vane 100 of the plurality of circumferentially-spaced outlet guide vanes 52 (FIG. 1), according to one example, and FIG. 11 depicts a cross-sectional, top view of the outlet guide vane 100 of FIG. 10, along line 11-11 of FIG. 10, according to one example.

As can be best seen in FIG. 10, each of the acoustic cavities 450 of the plurality of acoustic cavities 451 can include a plurality of embedded elements such as internal beams 901. Each of the internal beams 900 of the plurality of internal beams 901 can extend from a first cavity wall 455*a* to a second cavity wall 455*b*. For example, and as shown, each of the internal beams 900 of the plurality of internal beams 901 extend continuously from the first cavity wall 455*a* to the second cavity wall 455*b*. In this example, the first cavity wall 455*a* and the second cavity wall 455*b* extend generally along a plane defined by the chordwise direction C of the airfoil 294 and the spanwise direction S (in and out of page of FIG. 10) of the airfoil 294. An angle 910, is formed between each of the internal beams 900 of the plurality of internal beams 901 and the plane defined by the chordwise direction C and the spanwise direction S. In this example, angle 910 is approximately forty-five degrees, such as thirty degrees to fifty-five degrees. However, in other examples, angle 910 can be approximately ninety degrees, such as eighty degrees to ninety degrees. In yet other examples, angle 910 can range from fifty-five degrees to eighty degrees.

As best seen in FIG. 11, each of the internal beams 900 only extend partially in the spanwise direction and in the chordwise direction and do not extend from a third cavity walls 455*c* and a fourth cavity wall 455*d* that extends generally perpendicularly to the plane defined by the spanwise direction S and the chordwise direction C. Also, as best seen in this view, each of the internal beams 900 is generally cylinder shaped. However, each of the internal beams 900 may be any shape. For example, each of the internal beams 900 can be shaped like a polyhedron, such as a tetrahedron, a hexagonal prism, a tetragonal frustrum, a hexagonal frustrum, a cuboid, etc. In other examples, each of the internal beams 900 can be shaped like a cone or a cylindrical annulus. In yet other examples, each of the internal beams 900 can be irregular shaped such that they include curved surfaces and flat surfaces, fillets or rounded surface intersections, etc. In some examples, each of the internal beams within the acoustic cavity 450 are the same shape. In other examples, at least one of the internal beams within the acoustic cavity 450 is a different shape than another one of the internal beams 900 within the acoustic cavity 450.

Including internal beams 900 within each of the acoustic cavities 450 of the plurality of acoustic cavities 451 of the airfoil 294 has several benefits. First, the size and shape and packing density of the internal beams 900 can be adjusted, or tuned, to attenuate a specific range of resonant frequencies by effectively changing the acoustic impedance of the plurality of acoustic cavities 451. For example, the internal beams 900 allow the tuning of the resonant frequencies to lower frequencies. Second, the internal beams 900 may provide structural support for the airfoil 294 when the airfoil 294 experiences a load. More specifically, the internal beams 900 may provide structural support for the cell walls of the airfoil 294 that extend generally along the plane defined by the spanwise direction S and the chord wise direction C. Third, the internal beams 900 may assist with additively manufacturing the cavity walls 455 of the airfoil 294. More specifically, the internal beams 900 may provide support to the cavity walls 455 of the airfoil 294 that extend generally along the plane defined by the spanwise direction S and the chordwise direction C (first cavity wall 455*a* and second cavity wall 455*b*) when those walls are being additively manufactured. Fourth, as the acoustic cavity air volumes may impeded somewhat the conductive heat transfer to the airfoil surface, the internal beams 900 add heat conduction paths that further are exposed to unsteady air that can add in convective heat transfer in addition to adding conduction heat transfers paths.

Turning now to FIGS. 12-17, airfoils 200 having heat exchanger assemblies 510, 520, 530, 540 are illustrated in isolation (i.e., without illustrating the acoustic suppression assemblies) for visual convenience purposes. However, these and other heat exchanger assemblies can subsequently be combined with the acoustic suppression assemblies disclosed herein.

Figure 12:
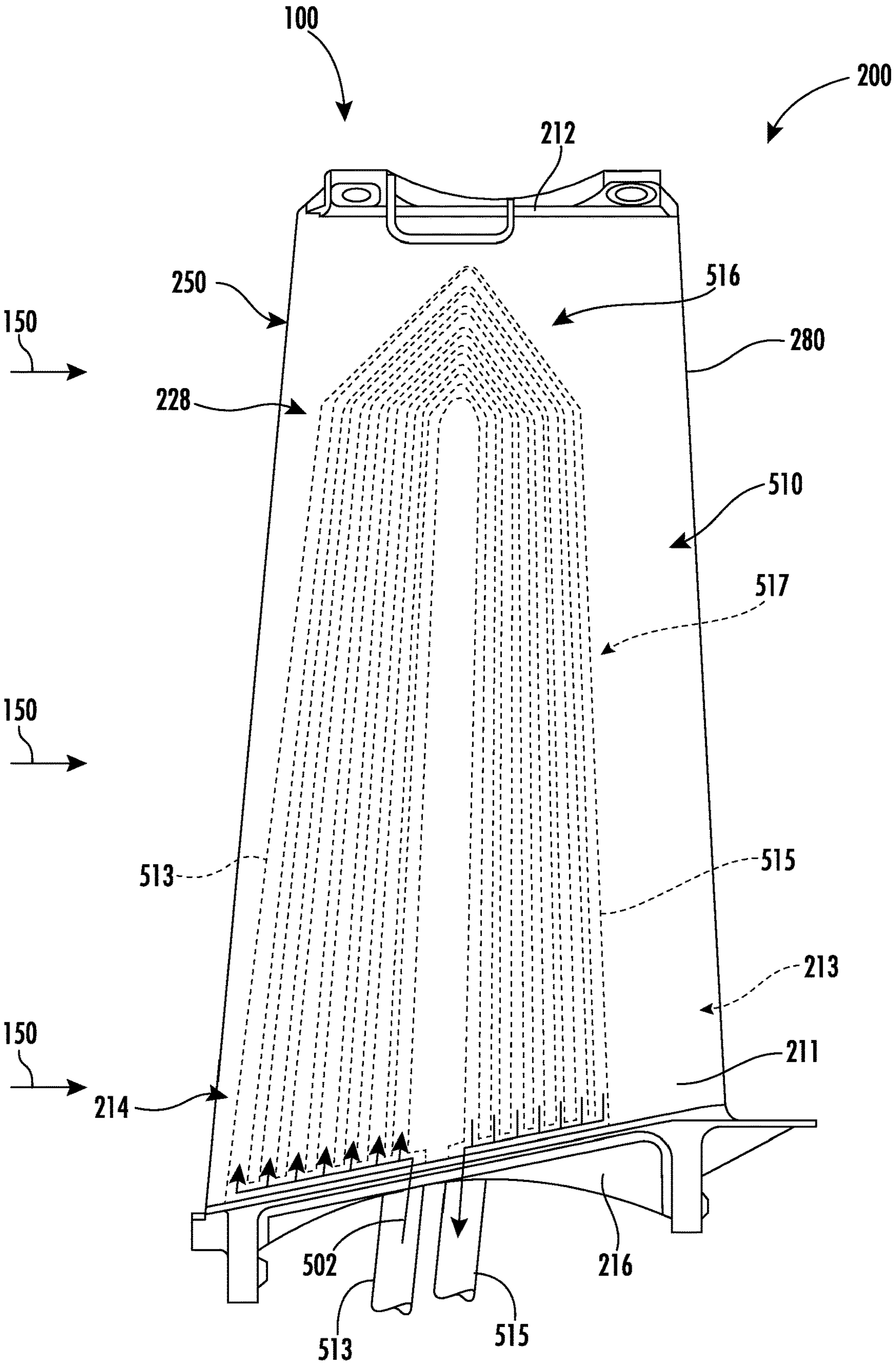
FIG. 12 is a schematic, cross-sectional, side view of an airfoil with a heat exchanger assembly in accordance with one or more exemplary embodiments.

Referring now to FIG. 12, a perspective view of an airfoil 200 with one example of a heat exchanger assembly 510 is provided that may be used with the turbofan engine 10 (shown in FIG. 1). In the exemplary embodiment, the heat exchanger assembly 510 is an air-cooled oil cooler (ACOC) and is defined within the outlet guide vane 100. Alternatively, the heat exchanger assembly 510 is any other heat exchanger assembly, including, without limitation, an air-to-air heat exchanger assembly, or any other fluid-to-air heat exchanger assembly utilizing a suitable fluid, such as, fuel, glycol, or a synthetic heat transfer liquid configured to interact between a heat source and the fan duct air. As before, the outlet guide vane 100 includes the airfoil 200 that includes the suction side 213 coupled to the pressure side 214. Suction side 213 and pressure side 214 define the leading edge 250 and the trailing edge 280 opposite leading edge 250. Suction side 213 and pressure side 214 further define the root end 211 and the tip end 212 opposite the root end 211. In some embodiments, such as that illustrated in FIG. 12, an inner platform 216 is disposed at root end 211.

The heat exchanger assembly 510 generally includes at least one cooling channel 517 having an inlet section 513, an outlet section 515, and a middle section 516 within the airfoil 200 extending between the inlet section 513 and the outlet section 515. The inlet section 513 and outlet section 515 can be positioned at various locations of the airfoil 200 such as, for example, both located at the root end 211 of the airfoil 200 (as illustrated), one located at the root end 211 of the airfoil 200 and one located at the tip end 212 of the airfoil 200, or other variations with one or more different locations about the airfoil 200. FIG. 12 illustrates a plurality of cooling channels 517 in a parallel arrangement and defined within airfoil 200. However, any number of cooling channels 517 may be defined within the airfoil 200 that enables the heat exchanger assembly 510 to operate as described herein. As illustrated, the cooling channels 517 can be substantially U-shaped wherein each cooling channel 517 includes at least one inlet section 513 that extends from the root end 211 towards the tip end 212 at the leading edge 250 and at least one outlet section 515 that extends from the tip end 212 to the root end 211 at the trailing edge 280. However, depending on the locations of the inlet section 513 and the outlet section 515, the cooling channels 517 may include alternative configurations as well. In some embodiments, cooling channels 517 may be defined adjacent to the leading edge 250. Moreover, the inlet section 513 and outlet section 515 can also be disposed at various locations around the airfoil 200. For instance, the location of the inlet section 513, the outlet section 515, or combinations thereof may be adjusted to facilitate a serial connection with one or more adjacent airfoils 200. That is, a two or more adjacent airfoils may be serially connected through their respective heat exchanger assemblies (not illustrated). Thus, the outlet section 515 of one airfoil may be positioned to be adjacent the inlet section 513 of an adjacent airfoil. Such embodiments can provide for a continuous flow path between two more serially connected airfoils 200.

The cooling channels 517 can be sized to facilitate maintaining a flow velocity of fluid that is channeled therethrough for consistent heat transfer, while also maintaining a predetermined wall thickness of airfoil 200. For example, one or more cooling channels 517 can have a constant cross-sectional profile along the length of each cooling channel 517. However, in some embodiments, one or more cooling channels 517 can have a varying cross-sectional profile along the length of the cooling channel 517 to correspond to the varying shape of airfoil 200. In another example, each cooling channel 517 may have a similar cross-sectional profile to the adjacent cooling channel(s) 517. In yet another example, each cooling channel 517 may have a different cross-sectional profile to the adjacent cooling channel(s) 517 to correspond to the varying shape of airfoil 200.

In operation, engine oil 502, such as, for example, oil from a power gearbox 145 of the turbofan engine 10 (FIG. 1), can be channeled to the heat exchanger assembly 510 and through cooling channels 517 by an inlet line 513 of an engine oil system for heat to be extracted therefrom. The outlet guide vane 100 can be positioned in the bypass airflow passage 56 (shown in FIG. 1) such that a fan air stream 150 is channeled past airfoil 200 and acts as a coolant fluid for the heat exchanger assembly 510. Specifically, fan air stream 150 can impinge the airfoil 200 at an impingement zone 228. Impingement zone 228 refers to an external impingement zone configured such that an external fluid, such as the fan air stream 150 impinges the airfoil 200. Impingement zone 228 can be defined at or around the leading edge 250 between root end 211 and tip end 212 and include adjacent portions of pressure side 214 and suction side 213 wherein fan air stream 150 strikes against airfoil 200. After impinging airfoil 200, fan air stream 150 then flows along both the pressure side 214 and the suction side 213 of the airfoil 200 towards trailing edge 280.

At impingement zone 228, a heat transfer coefficient of fan air stream 150 will increase due to the stream impinging on airfoil 200. As such, at least some or part of the cooling channels 517 can be defined near the leading edge 250 and within impingement zone 228 to transfer heat from engine oil 502 to fan air stream 150. For example, inlet sections 513 can be defined at the leading edge 250 such that heat transfer between engine oil 502 and the fan air stream 150 can be increased.

Furthermore, as engine oil 502 is channeled through cooling channels 517 that are outside of impingement zone 228, heat is further removed by convection and conduction cooling through fan air stream 150 channeling from the leading edge 250 to the trailing edge 280 of the airfoil. For example, as illustrated in FIG. 12, the outlet sections 515 can be closer to the trailing edge 280 than the inlet section 513. Even if the heat transfer coefficient of fan air stream 150 is reduced outside of impingement zone 228, heat from engine oil 502 can still be transferred to fan air stream 150 via the airfoil 200. The cooled engine oil 502 is then channeled back to the engine oil system through outlet section 515.

Figure 13:
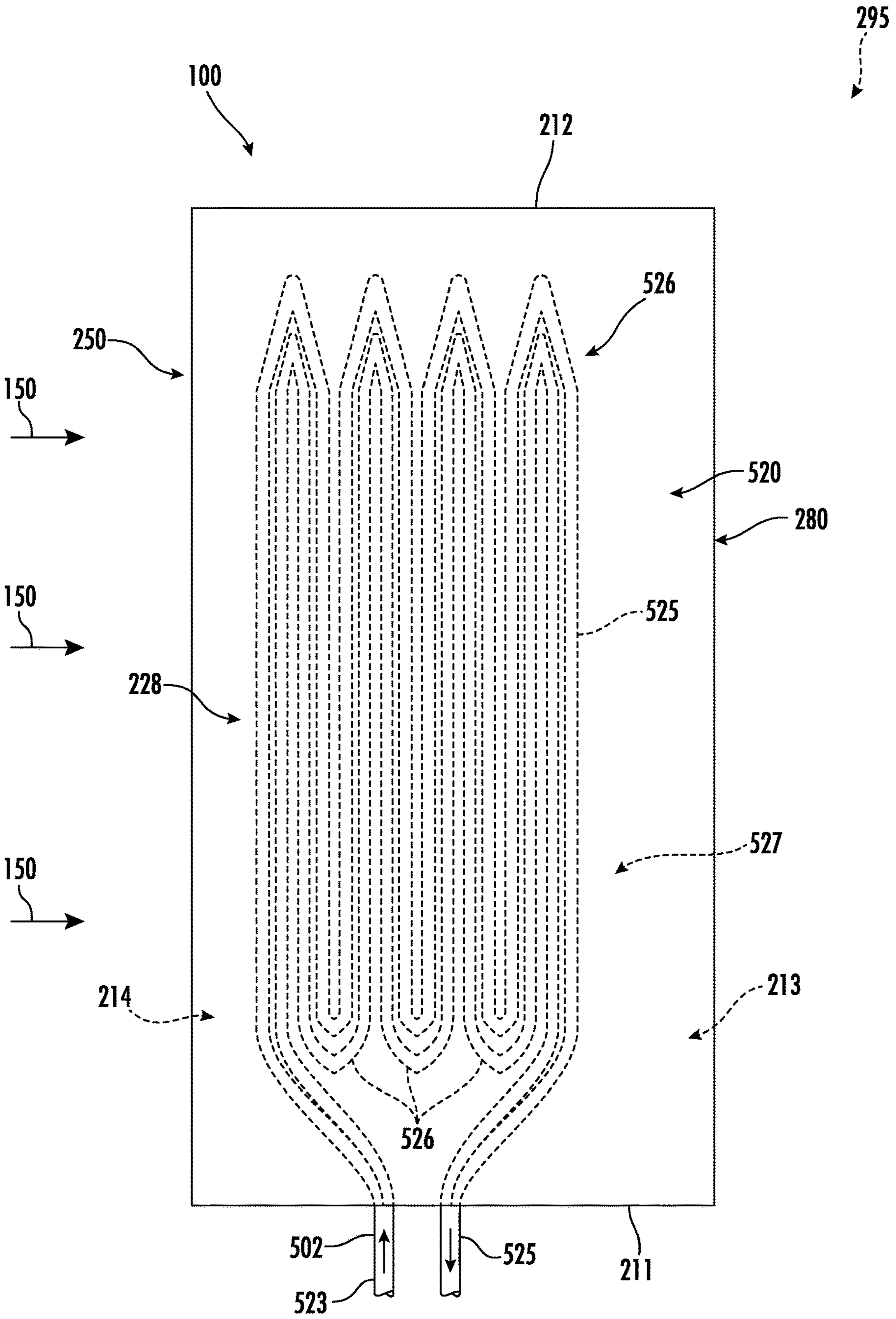
FIG. 13 is a schematic, cross-sectional, side view of an airfoil with a heat exchanger assembly in accordance with one or more exemplary embodiments.

Referring now to FIG. 13, a side view of another airfoil 295 with another example of a heat exchanger assembly 520 is provided that may be used with the turbofan engine 10 (shown in FIG. 1). Airfoil 295 is similar to the airfoil 200 unless otherwise noted. In this embodiment, the heat exchanger assembly 520 is still defined within the outlet guide vane 100. Similar to the embodiment described above, the outlet guide vane 100 includes the airfoil 295 that includes the suction side 213, the pressure side 214, the leading edge 250, the trailing edge 280, the root end 211, and the tip end 212.

The heat exchanger assembly 520 generally includes at least one cooling channel 527 having an inlet section 523 (such as at the root end 211 as illustrated), an outlet section 525 (such as also at the root end 211 as illustrated), and a middle section 526 within the airfoil 200 extending between the inlet section 523 and the outlet section 525. However, as discussed above the inlet section 523 and the outlet section 525 may additionally, or alternatively, be located at one or more other locations about the airfoil 295.

FIG. 13 illustrates two cooling channels 527 in a parallel arrangement and defined within airfoil 200. However, in alternative embodiments, any other number of cooling channels 527 can be defined therein that enables heat exchanger assembly 520 to operate as described herein. As illustrated, the cooling channels 527 have a substantially serpentine shape. Each cooling channel 527 includes at least one inlet section 523 that extends from the root end 211 towards the tip end 212 at the leading edge 250 and at least one outlet section 525 that extends from the tip end 212 to the root end 211 adjacent the trailing edge 280. Between the inlet section 523 and the outlet section 525, the cooling channels 527 include at least one middle section 526 that extends from the inlet section 523 at the tip end 212 towards the root end 211 and from the root end 211 back towards the outlet section 525 at the tip end 212. FIG. 13 further illustrates three middle sections 526 defined within the airfoil 200; however, in alternate embodiments, any other number of middle sections can be defined therein that enables heat exchanger assembly 520 to operate as described herein. Additionally, the cooling channels 527 are defined adjacent to leading edge 250. In alternative embodiments, the cooling channels 527 can be additionally or alternatively defined adjacent to the trailing edge 280.

Similar to the embodiment described above with respect to FIG. 12, the cooling channels 527 are sized to facilitate maintaining a flow velocity of fluid that is channeled therethrough for consistent heat transfer, while also maintaining a predetermined wall thickness of airfoil 295. For example, each cooling channel 527 can have a constant cross-sectional profile along the length of each cooling channel 527. In alternative embodiments, each cooling channel 527 can have a varying cross-sectional profile along the length of each cooling channel 527 to correspond to the varying shape of airfoil 295. In another example, each cooling channel 527 can have a similar cross-sectional profile to the adjacent cooling channel(s) 527. In alternative embodiments, each cooling channel 527 can have a different cross-sectional profile to the adjacent cooling channel(s) 527 to correspond to the varying shape of airfoil 295.

In operation, the engine oil 502 is channeled to the heat exchanger assembly 520 and through the cooling channels 527 by the inlet line 523 for heat to be extracted therefrom. Specifically, the fan air stream 150 impinges the airfoil 295 at the impingement zone 228. At the impingement zone 228, heat is transferred from the engine oil 502 channeled through cooling channels 527. Furthermore, as the engine oil 502 is channeled through cooling channels 527 that are outside of the impingement zone 228, heat is further removed by convection and conduction cooling through the fan air stream 150 along the airfoil 200. The cooled engine oil 502 is then channeled back to the engine oil system through outlet line 525.

Figure 14:
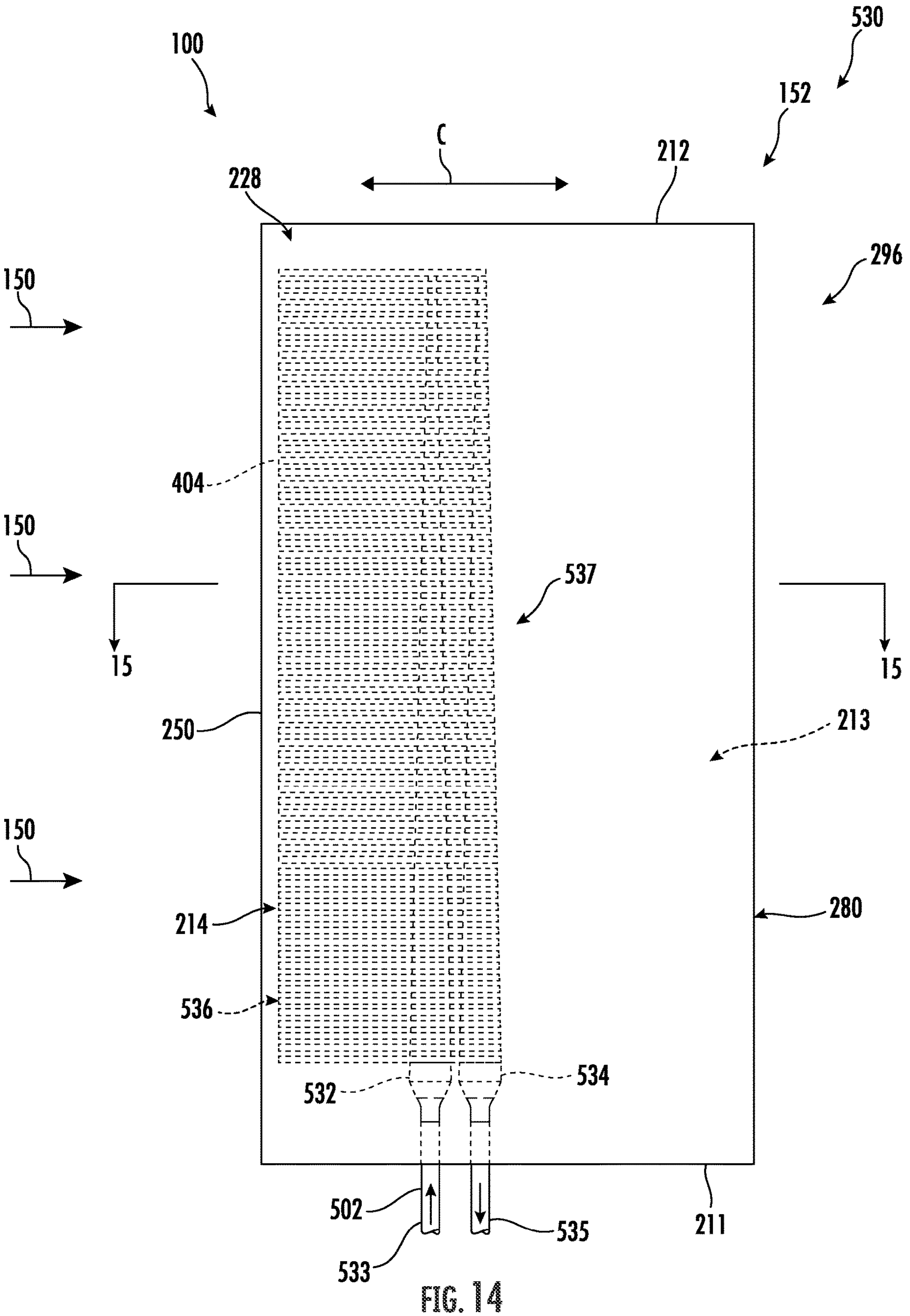
FIG. 14 is a schematic, cross-sectional, side view of an airfoil with a heat exchanger assembly in accordance with one or more exemplary embodiments.
Figure 15:
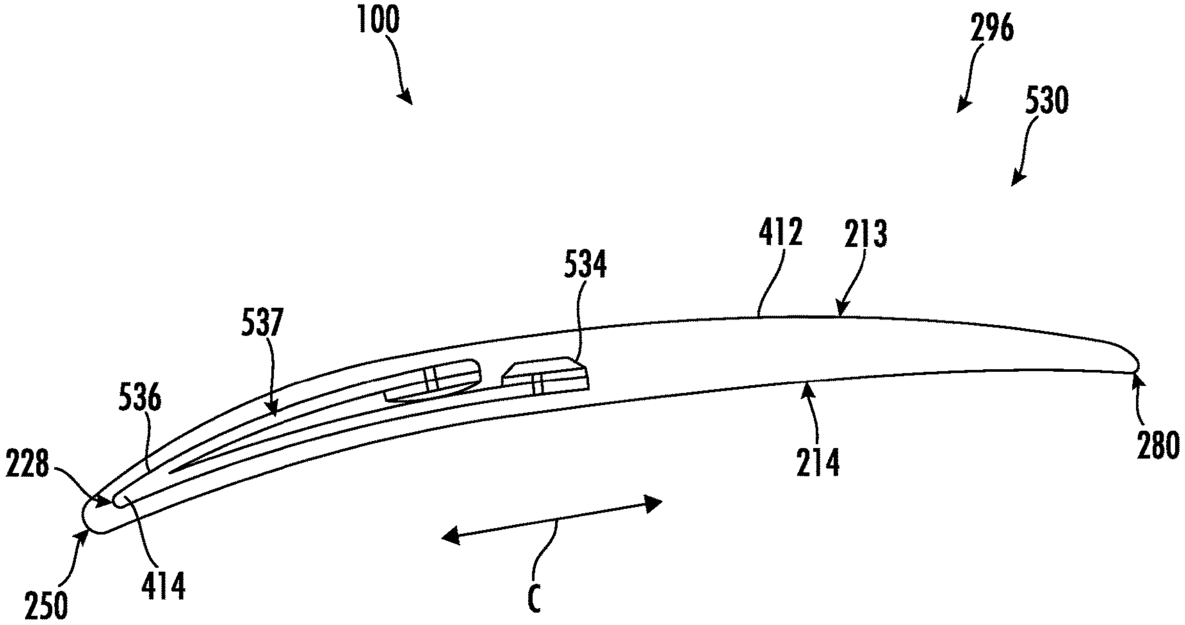
FIG. 15 is a cross-sectional, front view of the airfoil of FIG. 14 in accordance with one or more exemplary embodiments.

Referring now to FIG. 14, a side view of another airfoil 296 with another heat exchanger assembly 530 is provided that may be used with turbofan engine 10 (shown in FIG. 1). Airfoil 296 is similar to the airfoil 200 unless otherwise needed. FIG. 15 is a cross-sectional view taken along 15-15 of the heat exchanger assembly 530 shown in FIG. 14. Referring to FIGS. 14 and 15, the heat exchanger assembly 530 is still defined within outlet guide vane 100. Similar to the embodiments described above, outlet guide vane 100 includes the airfoil 296 that includes the suction side 213, the pressure side 214, the leading edge 250, the trailing edge 280, the root end 211, and the tip end 212. The airfoil 200 further defines a chordwise direction C.

As illustrated, the heat exchanger assembly 530 generally includes at least one cooling channel 537 defined within the airfoil 296 between the leading edge 250 and the trailing edge 280. For example, cooling channels 537 include an inlet section 532 that extends from the root end 211 towards the tip end 212 adjacent the suction side 213 and an outlet section 534 that extends from the tip end 212 to the root end 211 adjacent the pressure side 214. The inlet section 532 is within the airfoil 296 and can be more adjacent the leading edge 250 than the trailing edge 280. The outlet section 534 is also within the airfoil 296 and can be between the inlet section 532 and the trailing edge 280.

Between the inlet section 532 and the outlet section 534, cooling channels 537 include a middle section 536 that extends substantially parallel to and along chord direction C towards the leading edge 250. As such, the middle section 536 is substantially parallel to the root end 211 and the tip end 212 of the airfoil 296 while also being substantially orthogonal to the leading edge 250. Cooling channels 537 further include a surface 414, and the impingement zone 228. The impingement zone 228 can be an internal impingement zone configured such that, an internal fluid such as engine oil 502 will impinge airfoil 200 at impingement zone 228. Additionally, the middle section 536 is disposed at least partially within impingement zone 228. FIG. 14 illustrates a plurality of cooling channels 537 defined within airfoil 296. However, in alternative embodiments, any other number of cooling channels can be defined therein that enables heat exchanger assembly 530 to operate as described herein.

Similar to the embodiments described above, the cooling channels 537 are sized to facilitate maintaining a flow velocity of fluid that is channeled therethrough for consistent heat transfer, while also maintaining a predetermined wall thickness of airfoil 296. For example, the inlet section 532 and the outlet section 534 each have a conical shape that extend from the root end 211 towards the tip end 212 with each cooling channel 537 having a similar cross-section area extending therebetween. As such, the flow velocity of fluid therethrough is constant throughout the middle section 536. In alternative embodiments, the inlet section 532 and the outlet section 534 may have other shapes that taper as they extend from the root end 211 towards the tip end 212, with each cooling channel having a similar cross section area extending therebetween.

In operation, the engine oil 502 is channeled to the heat exchanger assembly 530 and through cooling channels 537 by an inlet line 533 for heat to be extracted therefrom. Specifically, an external fluid, such as fan air stream 150 impinges the airfoil 200 at the impingement zone 228. The impingement zone 228 is an external impingement zone configured such that an external fluid impinges the airfoil 296 at the impingement zone 228. At the impingement zone 228, heat is transferred from engine oil 502 channeled through cooling channels 537. Furthermore, as the engine oil 502 is channeled through the cooling channels 537 that are outside of the impingement zone 228, heat is further removed by convection and conduction cooling through the fan air stream 150 along the airfoil from the leading edge 250 to the trailing edge 280. Additionally, in operation, the surface 414 provides an interface between the cooling channels 537 and the leading edge 250. The cooled engine oil 502 is then channeled back to the engine oil system through an outlet line 535.

Figure 16:
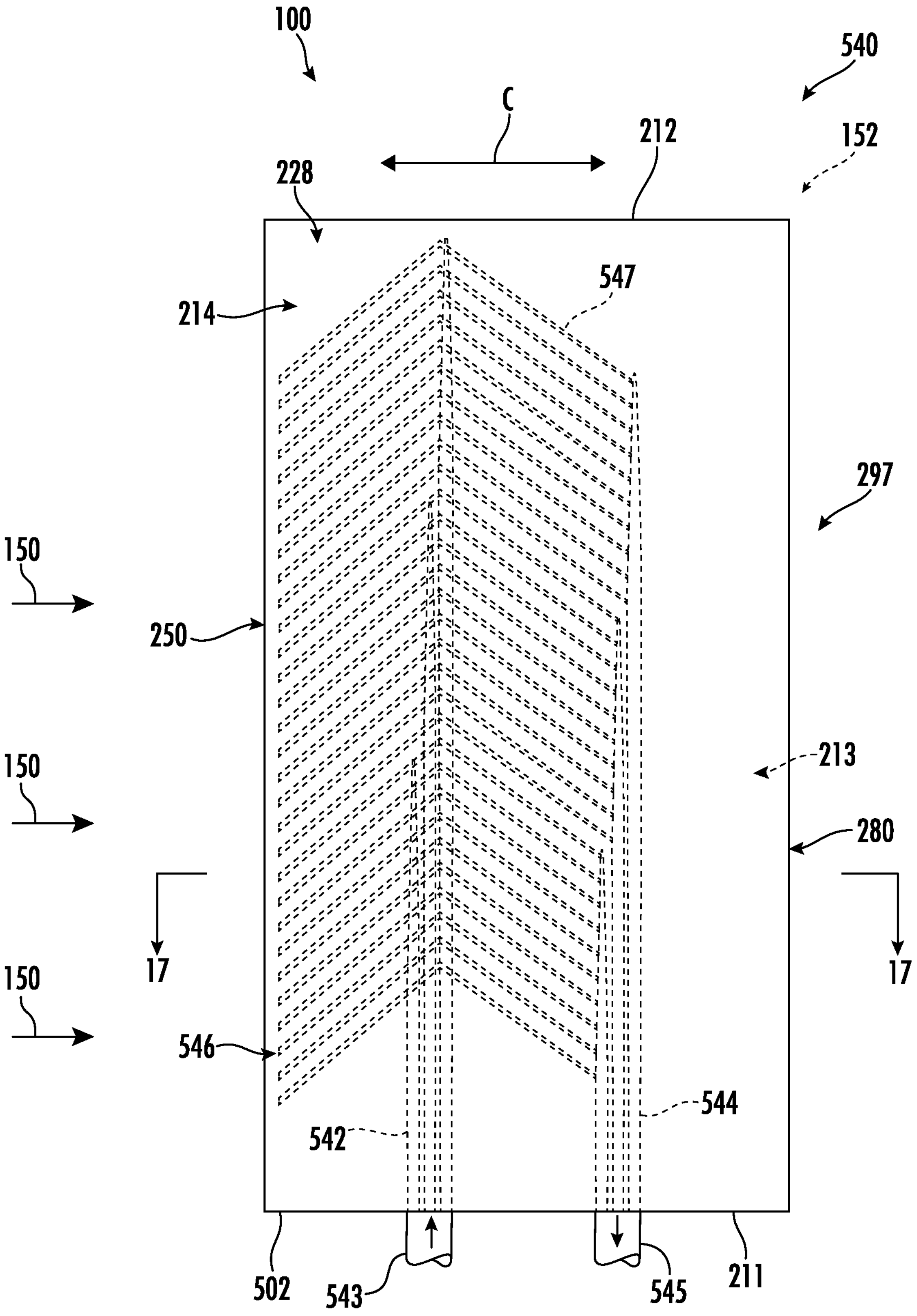
FIG. 16 is a schematic, cross-sectional, side view of an airfoil with a heat exchanger assembly in accordance with one or more exemplary embodiments.
Figure 17:
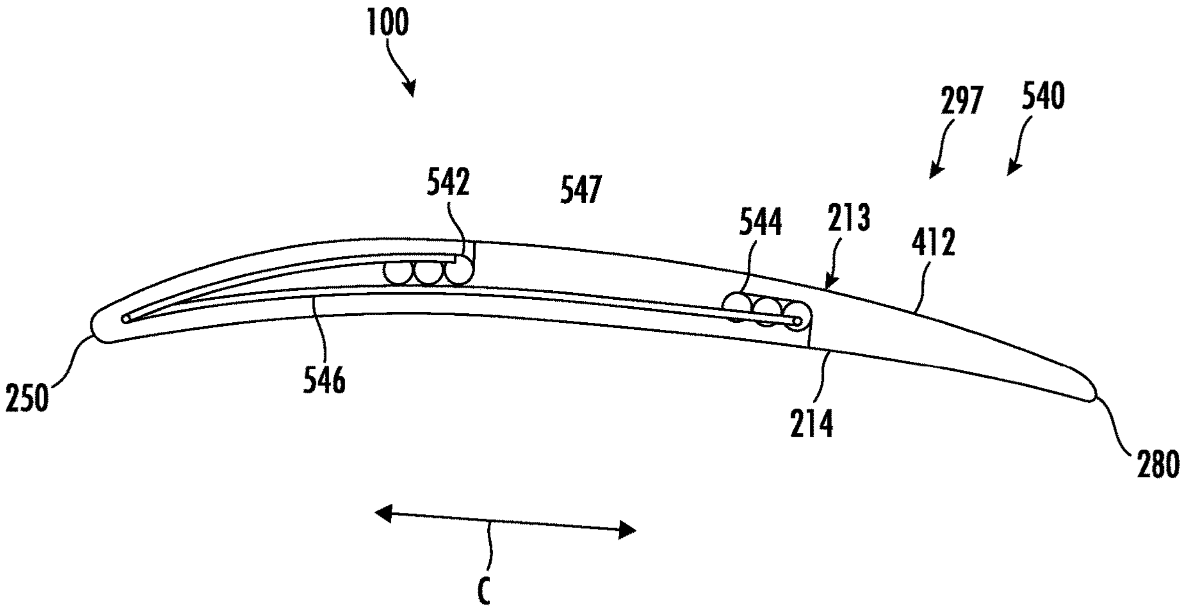
FIG. 17 is a cross-sectional, top view of the airfoil of FIG. 16 in accordance with one or more exemplary embodiments.

Referring now to FIG. 16 a side view of another airfoil 297 with another example heat exchanger assembly 540 is provided that may be used with turbofan engine 110 (shown in FIG. 1). FIG. 17 is a cross-sectional view taken along 17-17 of the heat exchanger assembly 540 shown in FIG. 16. The airfoil 297 is similar to the airfoil 200 unless otherwise noted. Referring to FIGS. 16 and 17, the heat exchanger assembly 540 is still defined within the outlet guide vane 100. Similar to the embodiments described above, the outlet guide vane 100 includes the airfoil 297 that includes the suction side 213, the pressure side 214, the leading edge 250, the trailing edge 280, the root end 211, and the tip end 212. The airfoil 297 further defines the chord direction C.

The heat exchanger assembly 540 generally includes at least one cooling channel 547 defined within the airfoil 200 between the leading edge 250 and the trailing edge 280. For example, cooling channels 547 include at least one inlet section 542 that extends from the root end 211 towards the tip end 212 and at least one outlet section 544 that extends from the tip end 212 to the root end 211.

Between the inlet sections 542 and the outlet sections 544, the cooling channels 547 include at least a section 546 that extends along chord direction C from inlet sections 542 towards the leading edge 250 and from the leading edge 250 to the outlet sections 544 such that the cooling channels 547 correspond to a perimeter of airfoil 200. In this exemplary embodiment, the cooling channels 547 are not parallel to the root end 211 and the tip end 212 of the airfoil 297 and not orthogonal to the leading edge 250. The cooling channels 547 extend at a slope along the chord direction C. For example, the cooling channels 547 can form secondary loops that leave the primary conduit by initially extending in a sloping direction from the tip end 212 towards the root end 211 and either towards the leading edge 250 or trailing edge 280, and then return back towards the primary conduit in a parallel path. The secondary loops can extend away from a primary conduit from both sides (i.e., towards the leading edge 250 on one side and towards the trailing edge 280 on the other side) to provide cooling channels that form an overall V-shaped pattern as illustrated. These secondary loops can provide a fluid pathway towards the leading edge 250, which defines a thinner profile and thereby provides greater convection opportunity for the fluid flowing through said pathways. In some embodiments, the cooling channels 547 may extend in any other sloping direction that enables the heat exchanger assembly 540 to operate as described herein. FIG. 16 illustrates a plurality of cooling channels 547 defined within the airfoil 200. However, in other embodiments, any other number of cooling channels can be defined therein that enables the heat exchanger assembly 540 to operate as described herein.

Similar to the embodiments described above, the cooling channels 547 are sized to facilitate maintaining a flow velocity of fluid that is channeled therethrough for consistent heat transfer, while also maintaining a predetermined wall thickness of the airfoil 297. For example, the inlet section 542 and the outlet section 544 can each have three conical shaped sections that extend from root end 211 towards tip end 212 with a predetermined number of cooling channels 547 having a similar cross-sectional flow area extending therebetween. As such, the flow velocity of fluid therethrough can be constant throughout each section of the cooling channels 547.

In operation, the engine oil 502 is channeled to the heat exchanger assembly 540 and through the cooling channels 547 by an inlet line 543 for heat to be extracted therefrom. Specifically, the fan air stream 150 impinges the airfoil 200 at the impingement zone 228. At the impingement zone 228, heat is transferred from the engine oil 502 channeled through the cooling channels 547. Furthermore, as the engine oil 502 is channeled through the cooling channels 547 that are outside of the impingement zone 228, heat can further be removed by convection and conduction cooling through the fan air stream 150 along the airfoil 297 from the leading edge 250 to the trailing edge 280. The cooled engine oil 502 is then channeled back to the engine oil system through an outlet line 545.

While certain exemplary embodiments and configurations of heat exchanger assemblies 500 are disclosed herein, these are not intended to be limiting and alternative configurations may also be realized. For instance, the cooling channels exemplified in FIGS. 12-17 are illustrated as single passage cooling channels that continuously extend as a single passage from one end to the other. However, in some embodiments (such as those described below with respect to FIGS. 19 and 20), the cooling channels may branch off into one or more secondary loops, combine together, or utilize combinations thereof. For instance, one or more cooling channels may bifurcate, trifurcate, or the like to for a plurality of different passages.

In some embodiments, select airfoils 200 within a row of circumferentially-spaced outlet guide vanes 52 (FIG. 1) may include just one of either the acoustic suppression assembly 400 or the heat exchanger assembly 500. For instance, a first plurality of circumferentially-spaced outlet guide vanes 52 may include the acoustic suppression assembly 400. Similarly, a second plurality of circumferentially-spaced outlet guide vanes 52 may include the heat exchanger assembly 500. The first and second plurality of circumferentially-spaced outlet guide vanes 52 can then be disposed within the turbofan engine to collectively, albeit not individually, provide both noise attenuation and fluid cooling enhancements. The first and second outlet guide vanes 100 can be distributed in any suitable configuration such as, for example, alternating the first plurality of circumferentially-spaced outlet guide vanes 52 having the acoustic suppression assemblies 400 with the second plurality of circumferentially-spaced outlet guide vanes 52 having the heat exchanger assemblies 500.

With reference again to FIG. 4, in some embodiments, the airfoil 200 can include both the acoustic suppression assembly 400 and the heat exchanger assembly 500 in a variety of potential configurations. In combination, the acoustic suppression assembly 400 can attenuate noise from the airfoil 200 produced from operation of the turbofan engine 10 (FIG. 1), while the heat exchanger assembly 510, 520, 530, 540 (FIGS. 12-17) can provide a cooling operation for internal fluid (e.g., engine oil 224 as illustrated in FIGS. 12-17) from the turbofan engine 10. The combined configuration of the acoustic suppression assembly 400 and the heat exchanger assembly 500 within a single airfoil 200 can take on a variety of different forms.

Figure 18:
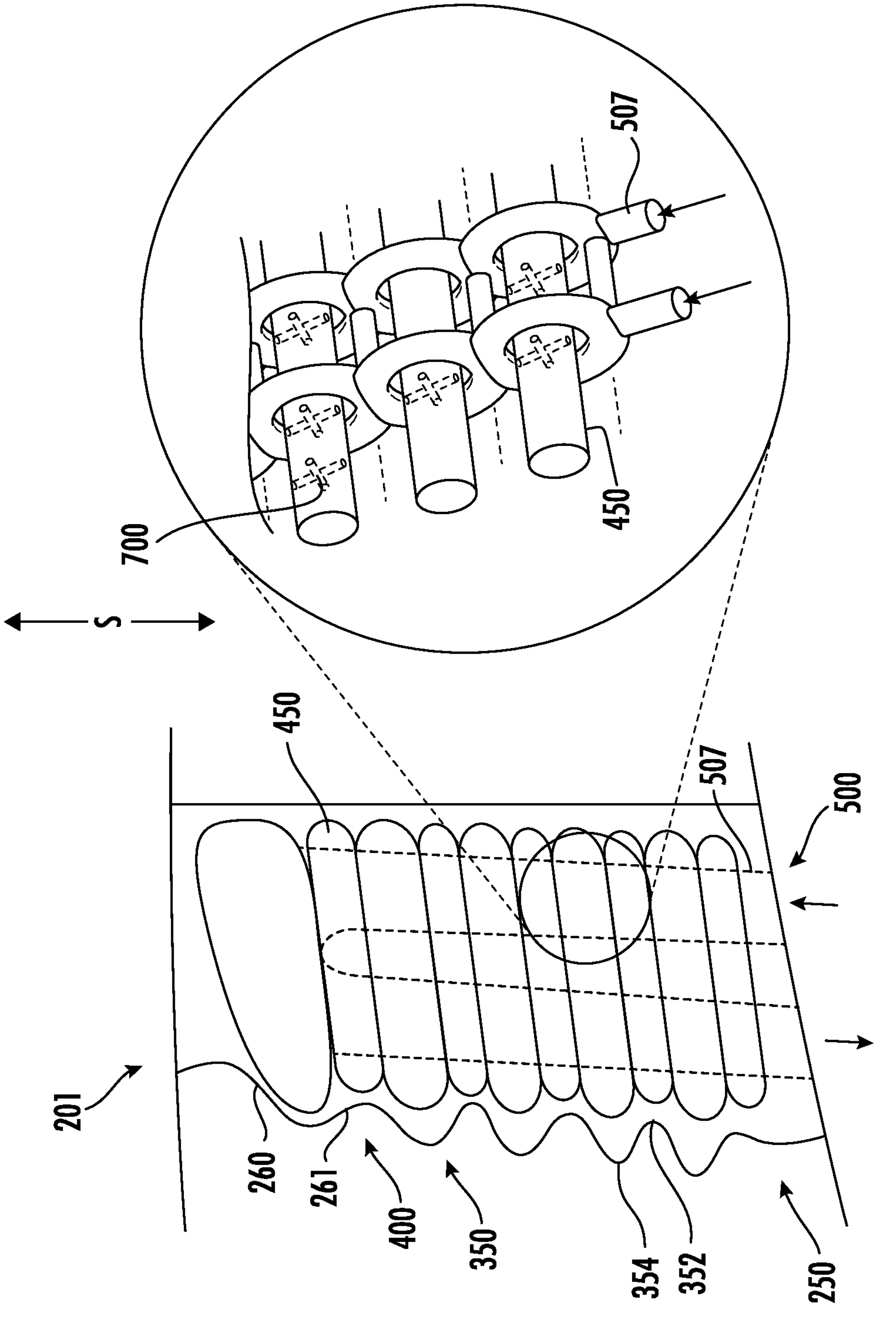
FIG. 18 is a schematic, cross-sectional, side view of an airfoil with an acoustic suppression assembly and a heat exchanger assembly in accordance with one or more exemplary embodiments.

For instance, with reference to FIG. 18, a schematic side view of a first exemplary airfoil 201 is illustrated having both an acoustic suppression assembly 400 and the heat exchanger assembly 500. In some embodiments, the exemplary airfoil 201 includes a leading edge member 260 such as a sculpted leading edge member 261. However, airfoils having leading edges 250 without additional leading edge members 260 may also be utilized for the acoustic suppression assemblies 400 and heat exchanger assemblies 500 disclosed herein. The leading edge 250 (with or without the leading edge member 260) may be a nonlinear patterned leading edge as illustrated. For example, for the embodiment shown, the leading edge 250 of the airfoil 201 is a waved leading edge 350 defining a plurality of peaks 354 and a plurality of valleys 352 alternatingly arranged along the spanwise direction S. Due to the aeroacoustic properties of the leading edge member 261, noise will be relatively lower at the plurality of peaks 354 and relatively higher at the plurality of valleys 352.

Thus, to provide a balance of noise attenuation and fluid cooling capability, the acoustic suppression assembly 400 and the heat exchanger assembly 500 can have respective portions alternated based on the position of the plurality of peaks 354 and the plurality of valleys 352. That is, each of the inlets (227 in FIG. 5) of the plurality of acoustic cavities 451 is positioned in a valley of the plurality of valleys 352. Likewise, the porous face sheet (460 in FIG. 5) can be a plurality of porous face sheets and each of the plurality of porous face sheets are positioned in a valley of the plurality of valleys 352. On the other hand, the at least one cooling channel 507 is positioned in at least one peak of the plurality of peaks 354. For instance, the cooling channel 507 can contain one or more secondary loops that extend from the cooling channel 507 to provide additional passage length that extends away from, and subsequently returns to, the cooling channel 507. The secondary loops can extend into one or more different locations in the airfoil 201 such as, for example, within the one or more of the plurality of peaks 354.

In some embodiments, one or more of the internal features may include internal beams 700. The internal beams 700 can include any structure or structures that cross all or part of the internal features. The internal beams 700 can provide structural support to the internal feature, provide increased surface area to the internal feature, provide a turbulation feature within the flow path in the internal feature, or combinations thereof. For example, in some embodiments, the acoustic cavities 450 may include internal beams 700. In some embodiments, the cooling channel 507 may include internal beams 700. In some embodiments, both the acoustic cavities 450 and the cooling channel 507 may include internal beams 700.

Figure 19:
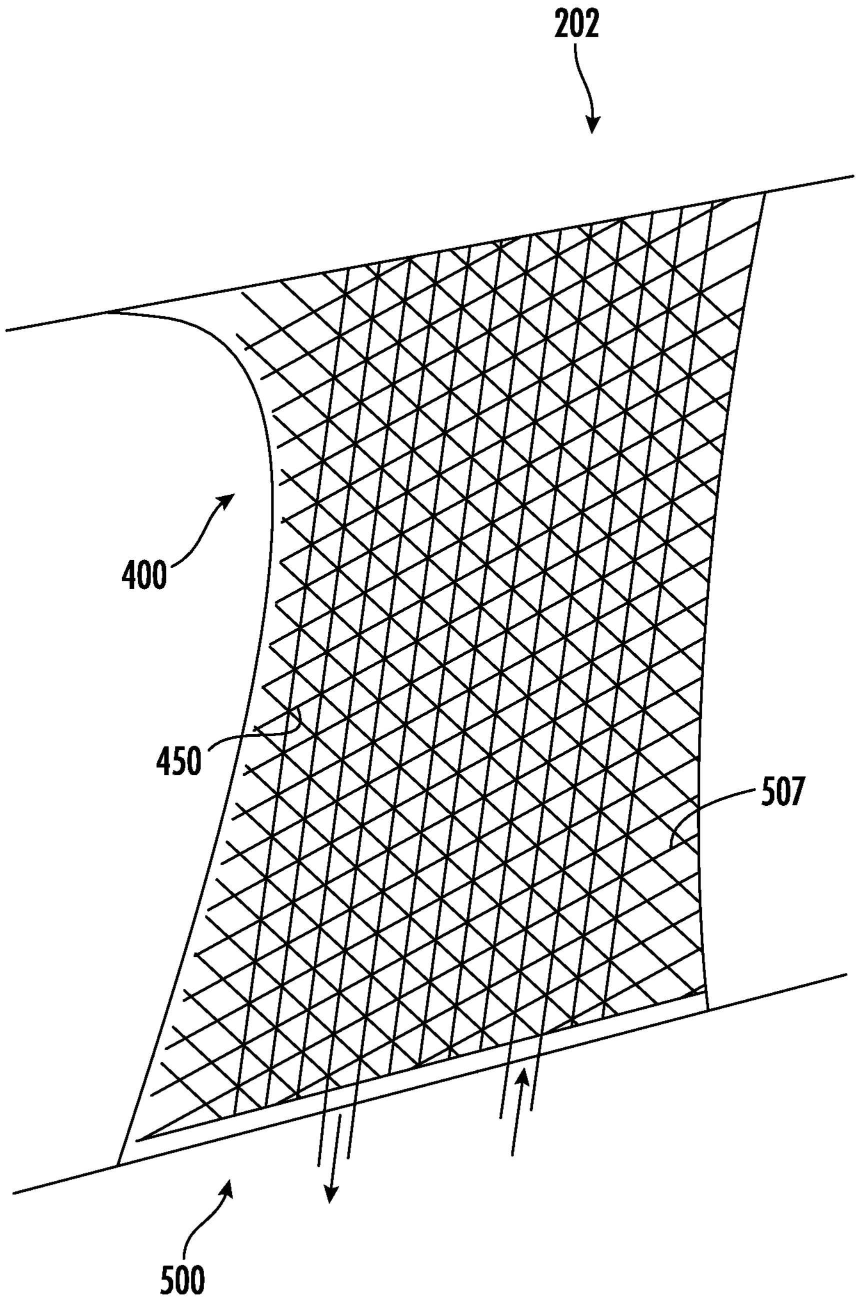
FIG. 19 is a schematic, cross-sectional, side view of an airfoil with an acoustic suppression assembly and a heat exchanger assembly in accordance with one or more exemplary embodiments.

With reference to FIG. 19, a schematic side view of a second exemplary airfoil 202 is illustrated having both an acoustic suppression assembly 400 and a heat exchanger assembly 500. The exemplary airfoil 202 includes a cooling channel 507 comprising multiple secondary loops. The multiple secondary loops can be achieved by bifurcating, trifurcating, or otherwise splitting the cooling channel 507 at one or more locations. The multiple secondary loops may further be reconsolidated at one or more locations along the cooling channel 507.

Figure 20:
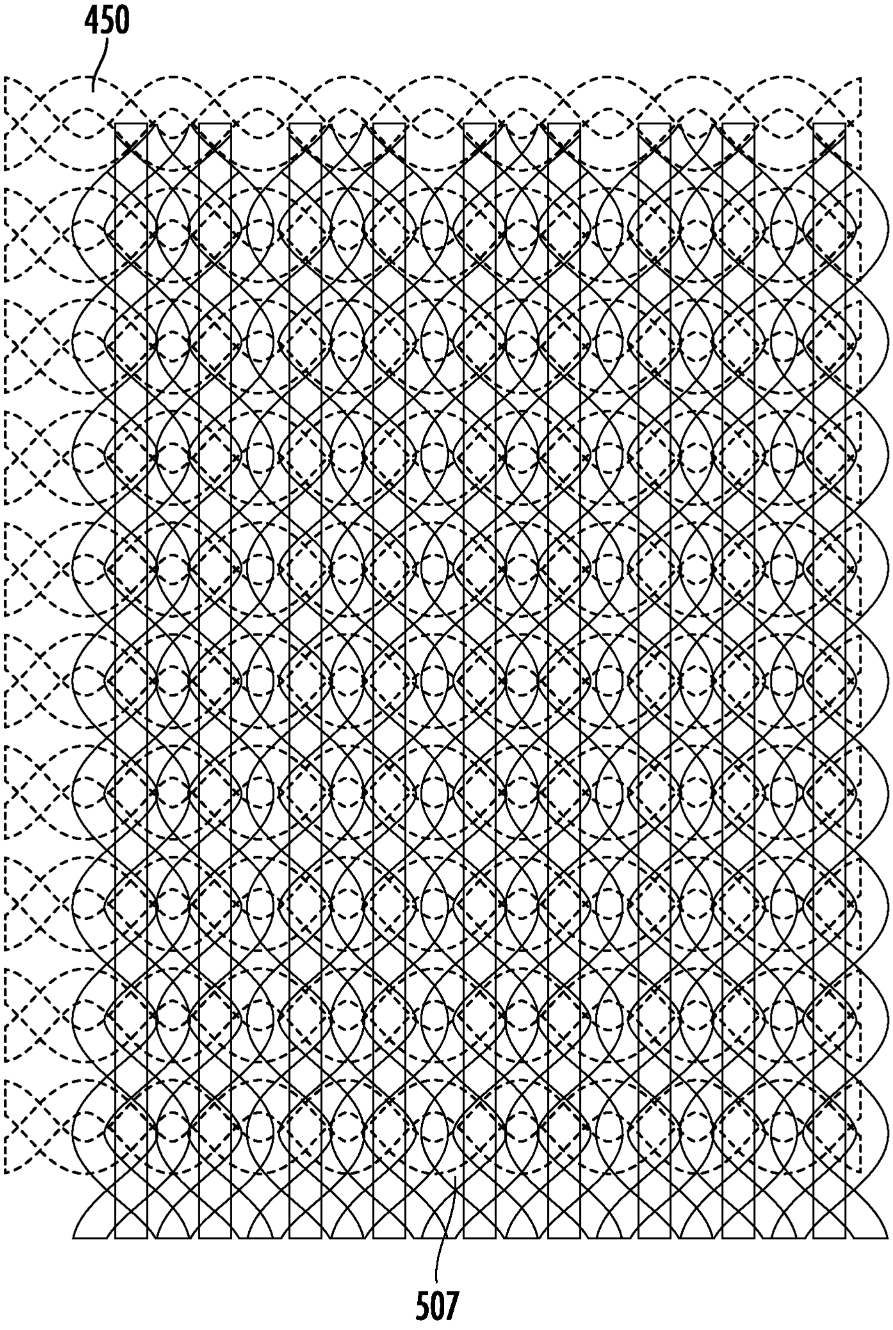
FIG. 20 is a closeup schematic view of an internal portion of the airfoil of FIG. 19 in accordance with one or more exemplary embodiments.

Moreover, with additional reference to FIG. 20, an isolated view of the cooling channel 507 and the acoustic cavities 450 is illustrated. The cooling channel 507 can be interwoven with one or more of the acoustic cavities 450, whether the cooling channel 507 is a single conduit, or whether it includes multiple secondary loops as illustrated. As used herein, interwoven refers to two or more internal passages being interlaced with one another such that the various passages pass by one another at one or more locations without the interior of the various passages intersecting one another.

The airfoils disclosed herein can be manufactured using a variety of suitable methods. In some embodiments, one or both of the components of the acoustic suppression assembly 400 and the heat exchanger assembly 500 can be additively manufactured, particularly when an airfoil includes both features. Additive manufacturing the components can enable more complex and intricate design through the layer-by-layer build process. For instance, in order to intertwine the plurality of cooling channels 507 of the heat exchanger assembly 500 with the acoustic cavities 450 of the acoustic suppression assembly 400, one or more portions of the airfoil or its components may be produced via additive manufacturing.

Although the airfoils disclosed herein are discussed in at least certain exemplary embodiments as being outlet guide vanes for a fan of a turbofan engine such as a gas turbine engine (e.g., outlet guide vanes 52 in FIG. 1), it will be appreciated that aspects of the airfoils disclosed herein may additionally or alternatively be incorporated into one or more other guide vanes of an engine, such as guide vanes internal to a turbomachine (e.g., inlet guide vanes and outlet guide vanes within a turbomachine, such as within a compressor section or a turbine section of a turbomachine). Moreover, while acoustic cavities and heat exchangers are disclosed herein at one or more locations with respect to one or more airfoils, alternative embodiments may further encompass these features at additional locations in an airfoil or turbofan engine, such as, for example, in bypass ducts (e.g., aft bypass ducts), supplemental structural supports, outer layers, or service plumbing within a turbofan engine.

This written description uses examples to disclose the preferred embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An airfoil defining a spanwise direction, a chordwise direction, a root end, a tip end opposite the root end, a leading edge, and a trailing edge opposite the leading edge, the airfoil comprising a body extending along the spanwise direction between the root end and the tip end, the body comprising a plurality of acoustic cavities each having an inlet on the airfoil; and at least one cooling channel having an inlet section, an outlet section and a middle section within the airfoil, the at least one cooling channel extending between the inlet section and the outlet section; and at least one porous face sheet positioned on at least one inlet of the plurality of acoustic cavities.

The airfoil of any clause herein, wherein the leading edge defines a plurality of peaks and a plurality of valleys alternatingly arranged along the spanwise direction.

The airfoil of any clause herein, wherein one or more of the inlets of the plurality of acoustic cavities is positioned in a valley of the plurality of valleys, and wherein the at least one porous face sheet is a plurality of porous face sheets and each of the plurality of porous face sheets is positioned in a valley of the plurality of valleys.

The airfoil of any clause herein, wherein at least a portion of the at least one cooling channel is positioned in at least one peak of the plurality of peaks.

The airfoil of any clause herein, wherein the inlet section and the outlet section are both at the root end of the airfoil.

The airfoil of any clause herein, wherein at least one of the inlet section or the outlet section is at the tip end of the airfoil.

The airfoil of any clause herein, wherein the at least one cooling channel or at least one of the plurality of acoustic cavities comprises a plurality of internal beams extending across an interior passage within the middle section.

The airfoil of any clause herein, wherein the at least one cooling channel comprises a plurality of secondary loops.

The airfoil of any clause herein, wherein the at least one cooling channel is interwoven around the plurality of acoustic cavities.

The airfoil of any clause herein, wherein at least one inlet of the plurality of acoustic cavities is at the leading edge of the airfoil.

The airfoil of any clause herein, wherein at least a portion of the at least one cooling channel is positioned near the leading edge.

The airfoil of any clause herein, wherein at least a portion of the at least one cooling channel is substantially U-shaped.

The airfoil of any clause herein, wherein the at least one cooling channel comprises two cooling channels in a parallel arrangement.

The airfoil of any clause herein, wherein at least a portion of the at least one cooling channel has a substantially serpentine shape.

The airfoil of any clause herein, wherein at least a portion of the at least one cooling channel has a varying cross-sectional profile along its length.

The airfoil of any clause herein, wherein the middle section extends substantially parallel to and a along the chord direction towards the leading edge.

The airfoil of any clause herein, wherein the at least one cooling channel includes at least a section that extends along chord direction from the inlet section towards the leading edge and from the leading edge to the outlet section such that the at least one cooling channel corresponds to a perimeter of the airfoil.

A turbofan engine comprising a fan section that comprises a fan having a plurality of fan blades; a turbomachine disposed downstream from the fan section, the turbomachine comprising a compressor section, a combustion section, and a turbine section in serial flow arrangement; and a plurality of circumferentially-spaced guide vanes that are positioned downstream of the fan, wherein each of the plurality of circumferentially-spaced guide vanes define a spanwise direction, a chordwise direction, a root end, a tip end opposite the root end, a leading edge, and a trailing edge opposite the leading edge, each of the plurality of circumferentially-spaced guide vanes comprising a body extending along the spanwise direction between the root end and the tip end, the body comprising a plurality of acoustic cavities each having an inlet; and at least one cooling channel having an inlet section, an outlet section, and a middle section within the body, the at least one cooling channel extending between the inlet section and the outlet section; and at least one porous face sheet positioned on at least one inlet of the plurality of acoustic cavities.

The turbofan engine of any clause herein, wherein the leading edge defines a plurality of peaks and a plurality of valleys alternatingly arranged along the spanwise direction.

The turbofan engine of any clause herein, wherein one or more of the inlets of the plurality of acoustic cavities is positioned in a valley of the plurality of valleys, and wherein the at least one porous face sheet is a plurality of porous face sheets and each of the plurality of porous face sheets is positioned in a valley of the plurality of valleys.

The turbofan engine of any clause herein, wherein at least one of the plurality of acoustic cavities comprises a plurality of internal beams extending across its interior.

The turbofan engine of any clause herein, wherein the at least one cooling channel comprises a plurality of secondary loops.

The turbofan engine of any clause herein, wherein the at least one cooling channel is interwoven around the plurality of acoustic cavities.

The turbofan engine of any clause herein, wherein the inlet section and the outlet section are both at the root end of the body.

The turbofan engine of any clause herein, wherein at least one of the inlet section or the outlet section is at the tip end of the body.

A turbofan engine comprising a fan section that comprises a fan having a plurality of fan blades; a turbomachine disposed downstream from the fan section, the turbomachine comprising a compressor section, a combustion section, and a turbine section in serial flow arrangement; and a first plurality of circumferentially-spaced outlet guide vanes that are positioned downstream of the fan, wherein each of the first plurality of circumferentially-spaced outlet guide vanes define a spanwise direction, a chordwise direction, a root end, a tip end opposite the root end, a leading edge, and a trailing edge opposite the leading edge, each of the first plurality of circumferentially-spaced outlet guide vanes comprising a body extending along the spanwise direction between the root end and the tip end, the body comprising a plurality of acoustic cavities each having an inlet; and at least one porous face sheet positioned on at least one inlet of the plurality of acoustic cavities; and a second plurality of circumferentially-spaced outlet guide vanes that are positioned downstream of the fan, wherein each of the second plurality of circumferentially-spaced outlet guide vanes define a spanwise direction, a chordwise direction, a root end, a tip end opposite the root end, a leading edge, and a trailing edge opposite the leading edge, each of the first plurality of circumferentially-spaced outlet guide vanes comprising at least one cooling channel having an inlet section, an outlet section, and a middle section within the body, the at least one cooling channel extending between the inlet section and the outlet section.

The turbofan engine of any clause herein, wherein the first plurality of circumferentially-spaced outlet guide vanes alternate with the second plurality of circumferentially-spaced outlet guide vanes.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An airfoil defining a spanwise direction, a chordwise direction, a root end, a tip end opposite the root end, a leading edge, and a trailing edge opposite the leading edge, the airfoil comprising:

a body extending along the spanwise direction between the root end and the tip end, the body comprising:

a plurality of acoustic cavities each having an inlet on the airfoil, the plurality of acoustic cavities extend into the airfoil generally parallel to a camber surface of the airfoil; and at least one cooling channel having an inlet section, an outlet section and a middle section within the airfoil, the at least one cooling channel extending between the inlet section and the outlet section, wherein at least one inlet of the plurality of acoustic cavities is at the leading edge of the airfoil, wherein the body includes a cavity wall that extends into the airfoil generally parallel to the camber surface of the airfoil, and wherein the cavity wall defines at least one of the plurality of acoustic cavities; and at least one porous face sheet positioned on at least one inlet of the plurality of acoustic cavities.

2. The airfoil of claim 1, wherein the leading edge defines a plurality of peaks and a plurality of valleys alternatingly arranged along the spanwise direction.

3. The airfoil of claim 2, wherein one or more of the inlets of the plurality of acoustic cavities is positioned in a valley of the plurality of valleys, and wherein the at least one porous face sheet is a plurality of porous face sheets and each of the plurality of porous face sheets is positioned in a valley of the plurality of valleys.

4. The airfoil of claim 2, wherein at least a portion of the at least one cooling channel is positioned in at least one peak of the plurality of peaks.

5. The airfoil of claim 1, wherein the inlet section and the outlet section are both at the root end of the airfoil.

6. The airfoil of claim 1, wherein at least one of the inlet section or the outlet section is at the tip end of the airfoil.

7. The airfoil of claim 1, wherein the at least one cooling channel or at least one of the plurality of acoustic cavities comprises a plurality of internal beams extending across an interior passage within the middle section.

8. The airfoil of claim 1, wherein the at least one cooling channel comprises a plurality of secondary loops.

9. The airfoil of claim 1, wherein the at least one cooling channel is interwoven around the plurality of acoustic cavities.

10. A turbofan engine comprising:

a fan section that comprises a fan having a plurality of fan blades;

a turbomachine disposed downstream from the fan section, the turbomachine comprising a compressor section, a combustion section, and a turbine section in serial flow arrangement; and a plurality of circumferentially-spaced guide vanes that are positioned downstream of the fan, wherein each of the plurality of circumferentially-spaced guide vanes define a spanwise direction, a chordwise direction, a root end, a tip end opposite the root end, a leading edge, and a trailing edge opposite the leading edge, each of the plurality of circumferentially-spaced guide vanes comprising:

a body extending along the spanwise direction between the root end and the tip end, the body comprising:

a plurality of acoustic cavities each having an inlet, the plurality of acoustic cavities extend into one of the plurality of circumferentially-spaced guide vanes generally parallel to a camber surface of the one of the plurality of circumferentially-spaced guide vanes; and at least one cooling channel having an inlet section, an outlet section, and a middle section within the body, the at least one cooling channel extending between the inlet section and the outlet section; and at least one porous face sheet positioned on at least one inlet of the plurality of acoustic cavities.

11. The turbofan engine of claim 10, wherein the leading edge defines a plurality of peaks and a plurality of valleys alternatingly arranged along the spanwise direction.

12. The turbofan engine of claim 11, wherein one or more of the inlets of the plurality of acoustic cavities is positioned in a valley of the plurality of valleys, and wherein the at least one porous face sheet is a plurality of porous face sheets and each of the plurality of porous face sheets is positioned in a valley of the plurality of valleys.

13. The turbofan engine of claim 10, wherein at least one of the plurality of acoustic cavities comprises a plurality of internal beams extending across its interior.

14. The turbofan engine of claim 10, wherein the at least one cooling channel comprises a plurality of secondary loops.

15. The turbofan engine of claim 10, wherein the at least one cooling channel is interwoven around the plurality of acoustic cavities.

16. The turbofan engine of claim 10, wherein the inlet section and the outlet section are both at the root end of the body.

17. The turbofan engine of claim 10, wherein at least one of the inlet section or the outlet section is at the tip end of the body, wherein the body includes a cavity wall that extends into the one of the plurality of circumferentially-spaced guide vanes generally parallel to a camber line the camber surface of the one of the plurality of circumferentially-spaced guide vanes, and wherein the cavity wall defines at least one of the plurality of acoustic cavities.

18. A turbofan engine comprising:

a fan section that comprises a fan having a plurality of fan blades;

a turbomachine disposed downstream from the fan section, the turbomachine comprising a compressor section, a combustion section, and a turbine section in serial flow arrangement; and a first plurality of circumferentially-spaced outlet guide vanes that are positioned downstream of the fan, wherein each of the first plurality of circumferentially-spaced outlet guide vanes define a spanwise direction, a chordwise direction, a root end, a tip end opposite the root end, a leading edge, and a trailing edge opposite the leading edge, each of the first plurality of circumferentially-spaced outlet guide vanes comprising:

a body extending along the spanwise direction between the root end and the tip end, the body comprising a plurality of acoustic cavities each having an inlet, the plurality of acoustic cavities extend into one of the first plurality of circumferentially-spaced guide vanes generally parallel to a camber surface of the one of the first plurality of circumferentially-spaced guide vanes; and at least one porous face sheet positioned on at least one inlet of the plurality of acoustic cavities; and a second plurality of circumferentially-spaced outlet guide vanes that are positioned downstream of the fan, wherein each of the second plurality of circumferentially-spaced outlet guide vanes define a spanwise direction, a chordwise direction, a root end, a tip end opposite the root end, a leading edge, and a trailing edge opposite the leading edge, each of the first plurality of circumferentially-spaced outlet guide vanes comprising:

at least one cooling channel having an inlet section, an outlet section, and a middle section within the body, that at least one cooling channel extending between the inlet section and the outlet section.

19. The turbofan engine of claim 18, wherein the first plurality of circumferentially-spaced outlet guide vanes alternate with the second plurality of circumferentially-spaced outlet guide vanes.

* * * * *